(12) United States Patent
Li et al.

(10) Patent No.: US 11,855,069 B2
(45) Date of Patent: Dec. 26, 2023

(54) CELL STRUCTURE HAVING DIFFERENT POLY EXTENSION LENGTHS

(71) Applicant: TAIWAN SEMICONDUCTOR MANUFACTURING COMPANY, LTD., Hsinchu (TW)

(72) Inventors: Jian-Sing Li, Hsinchu (TW); Chi-Yu Lu, Hsinchu (TW); Hui-Zhong Zhuang, Hsinchu (TW); Chih-Liang Chen, Hsinchu (TW)

(73) Assignee: TAIWAN SEMICONDUCTOR MANUFACTURING COMPANY, LTD., Hsinchu (TW)

( * ) Notice: Subject to any disclaimer, the term of this patent is extended or adjusted under 35 U.S.C. 154(b) by 250 days.

(21) Appl. No.: 17/371,631

(22) Filed: Jul. 9, 2021

(65) Prior Publication Data
US 2023/0009224 A1 Jan. 12, 2023

(51) Int. Cl.
| H01L 21/8238 | (2006.01) |
| H01L 27/02 | (2006.01) |
| H01L 27/092 | (2006.01) |
| G06F 30/392 | (2020.01) |
| H01L 29/423 | (2006.01) |

(52) U.S. Cl.
CPC ........ *H01L 27/0207* (2013.01); *G06F 30/392* (2020.01); *H01L 21/82385* (2013.01); *H01L 27/092* (2013.01); *H01L 29/42376* (2013.01)

(58) Field of Classification Search
CPC ....... H01L 21/823828; H01L 21/82385; H01L 27/092–098
See application file for complete search history.

(56) References Cited

U.S. PATENT DOCUMENTS

| 7,260,442 | B2 | 8/2007 | Hwang et al. | |
| 9,256,709 | B2 | 2/2016 | Yu et al. | |
| 2008/0142898 | A1* | 6/2008 | Watanabe | H01L 21/82385 257/369 |
| 2013/0032899 | A1* | 2/2013 | Moriyama | H01L 21/823418 257/410 |
| 2014/0040838 | A1 | 2/2014 | Liu et al. | |
| 2015/0278429 | A1 | 10/2015 | Chang | |
| 2018/0358272 | A1* | 12/2018 | Togo | H01L 29/42376 |
| 2020/0066720 | A1* | 2/2020 | Song | H01L 29/0649 |
| 2021/0020636 | A1* | 1/2021 | Lee | H01L 21/823821 |

* cited by examiner

*Primary Examiner* — Bryan R Junge
(74) *Attorney, Agent, or Firm* — Hauptman Ham, LLP

(57) ABSTRACT

A method of fabricating an integrated circuit. The method includes generating two first-type active zones and two second-type active zones, and generating a gate-strip intersecting the two first-type active zones and the two second-type active zones. The method further includes patterning one or more poly cuts intersecting the gate-strip based on a determination of a difference between the poly extension effect of a p-type transistor and the poly extension effect of an n-type transistor.

20 Claims, 13 Drawing Sheets

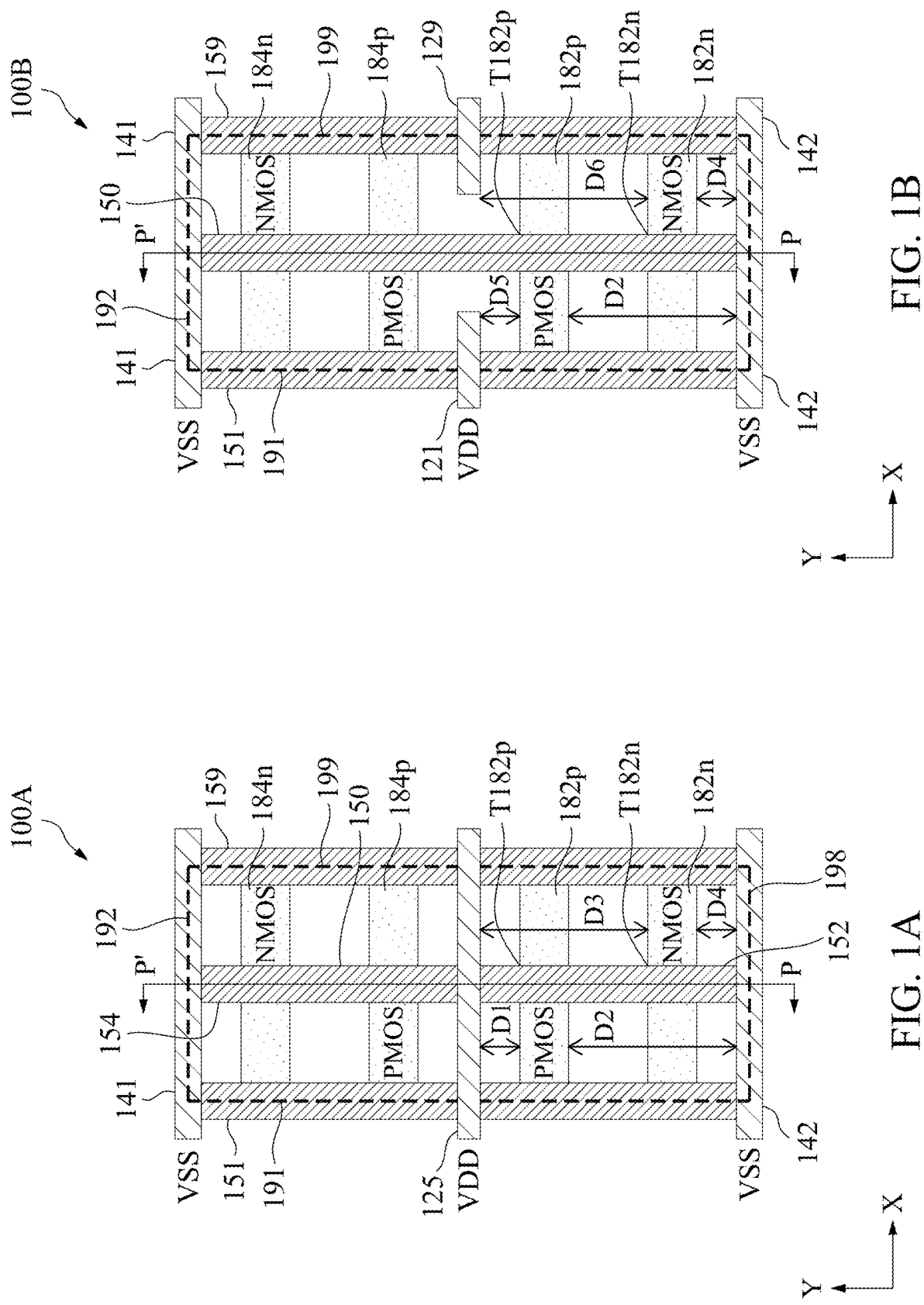

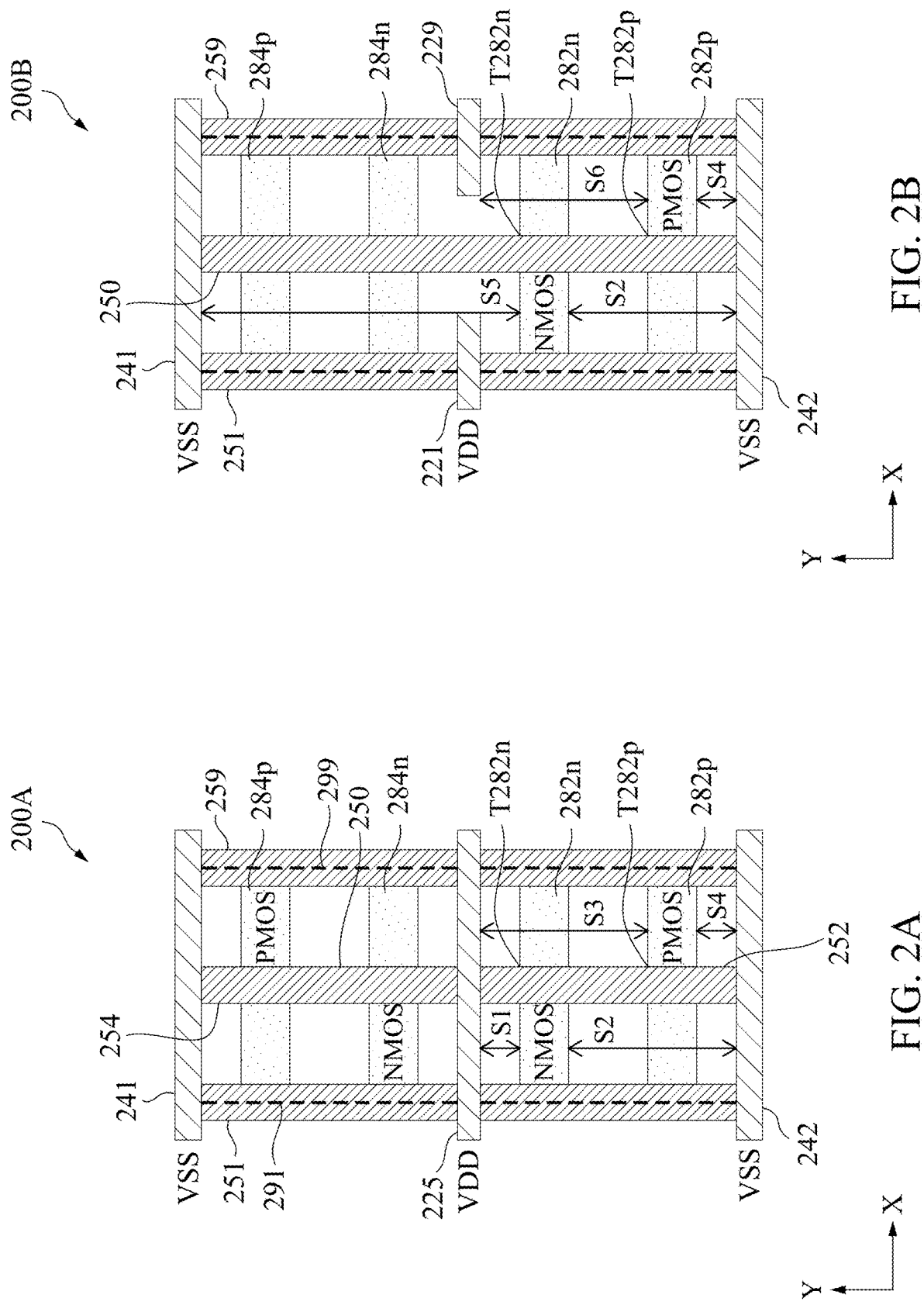

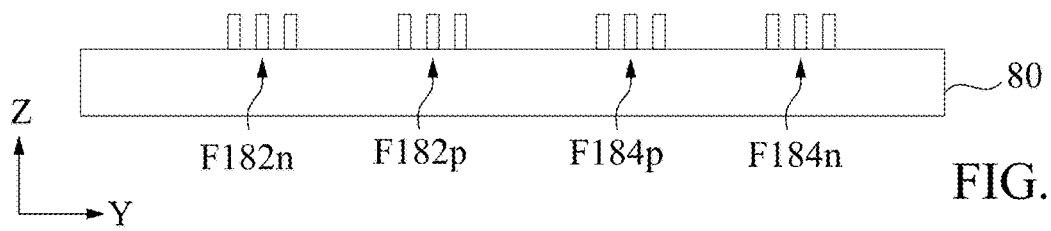
FIG. 4C(1)
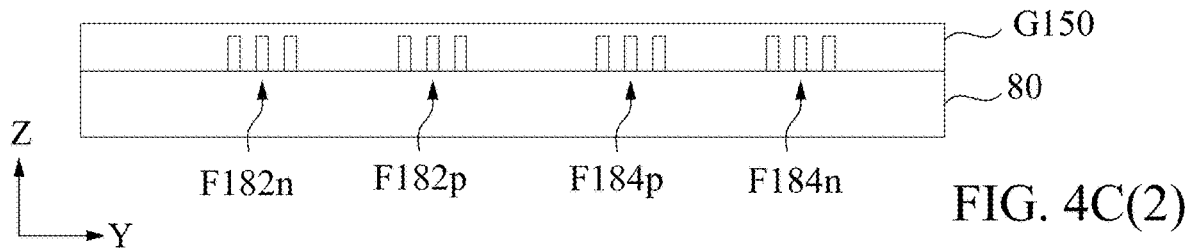
FIG. 4C(2)
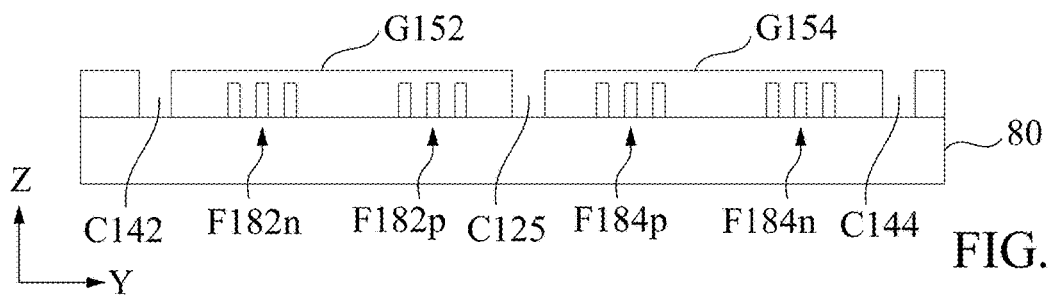
FIG. 4C(3)
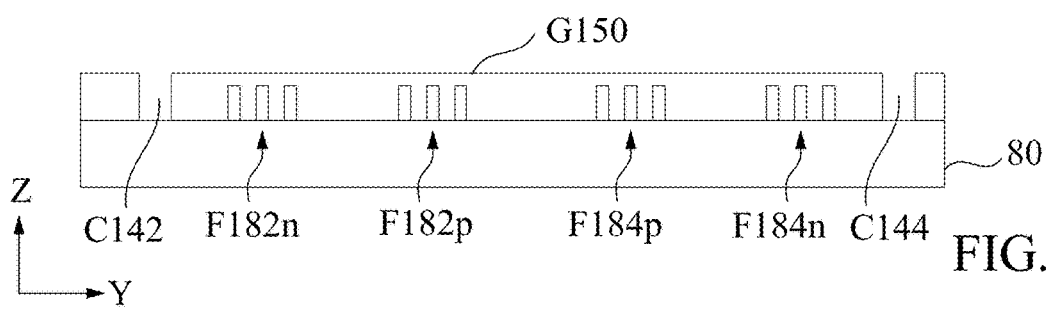
FIG. 4C(4)
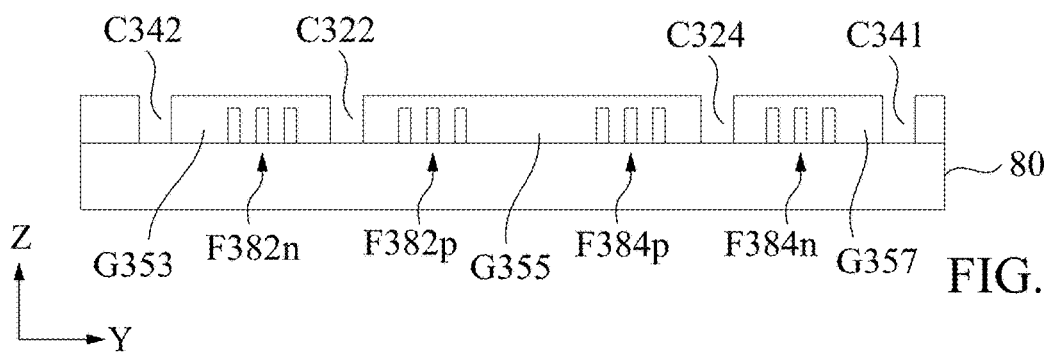
FIG. 4C(5)

CELL STRUCTURE HAVING DIFFERENT POLY EXTENSION LENGTHS

BACKGROUND

The recent trend in miniaturizing integrated circuits (ICs) has resulted in smaller devices which consume less power yet provide more functionality at higher speeds. The miniaturization process has also resulted in stricter design and manufacturing specifications as well as reliability challenges. Various electronic design automation (EDA) tools generate, optimize and verify standard cell layout designs for integrated circuits while ensuring that the standard cell layout design and manufacturing specifications are met.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

FIGS. 1A-1B are partial layout diagrams of cell structures, in accordance with some embodiments.

FIGS. 2A-2B are partial layout diagrams of cell structures, in accordance with some embodiments.

FIGS. 4C(1)-4C(5) are cross-sectional views of an integrated circuit along a cutting plan PP' (FIGS. 1A, 1B, 3D) at various stages of the fabrication following the flowchart in FIG. 4B, in accordance with some embodiments.

DETAILED DESCRIPTION

Figure 1C:
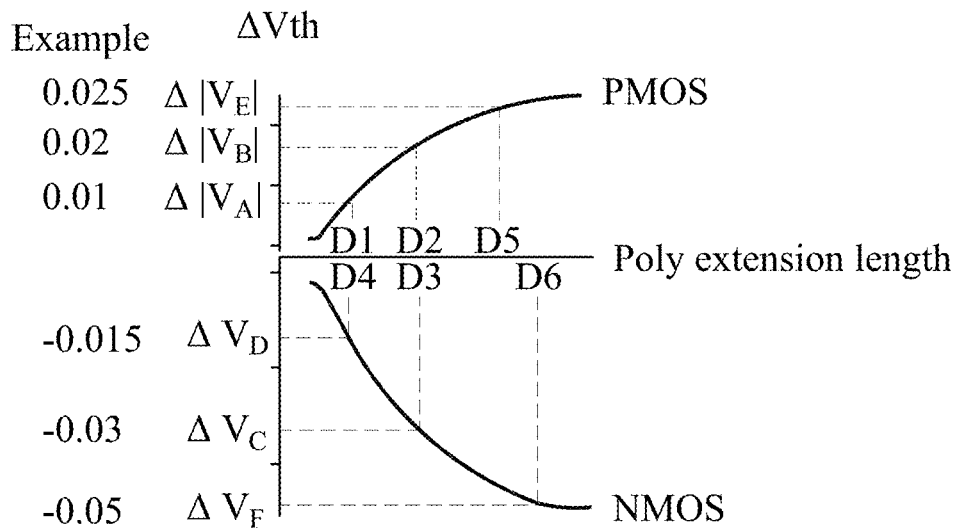
FIGS. 1C-1D are performance curves of individual transistors, in accordance with some embodiments.

The following disclosure provides many different embodiments, or examples, for implementing different features of the provided subject matter. Specific examples of components, materials, values, steps, operations, arrangements, or the like, are described below to simplify the present disclosure. These are, of course, merely examples and are not intended to be limiting. Other components, values, operations, materials, arrangements, or the like, are contemplated. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

The layout design of an IC often includes the layout designs of many cell structures. Each of the cell structures in the layout design specifies how a corresponding semiconductor cell structure is fabricated. A cell structure in a layout diagram often includes at least one p-type active zone pattern and at least one n-type active zone pattern. The p-type active zone pattern specifies a corresponding p-type active zone and the alignment of the channel regions, the source regions, and the drain regions of the p-type channel field effect transistors within the p-type active zone. The n-type active zone pattern specifies a corresponding n-type active zone and the alignment of the channel regions, the source regions, and the drain regions of the n-type channel field effect transistors within the n-type active zone. A cell structure in a layout diagram often also includes at least one gate-strip pattern. The intersection between a gate-strip pattern and a p-type active zone pattern specifies the channel region of a PMOS transistor. The intersection between a gate-strip pattern and an n-type active zone pattern specifies the channel region of an NMOS transistor.

When a gate-strip pattern in a cell structure is sufficiently extended to intersect multiple active zone patterns, one or more poly cut patterns overlapping with the gate-strip pattern divide the gate-strip pattern into multiple segments. Each segment of the gate-strip pattern specifies a corresponding gate-strip. In some embodiments, the intersection of a poly cut pattern and a gate-strip pattern specifies the part of the gate-strip that is removed during device fabrication. The length of the gate-strip in a fabricated device has influence over the threshold voltage of a transistor having the channel formed in the overlapping region between the gate-strip and an active zone. The influence of the extension length of the gate-strip over the threshold voltage change of a transistor is referred to as a poly extension effect. The absolute value of the threshold voltage change of a p-type transistor generally increases with the extension length of the gate-strip, and the absolute value of the threshold voltage change of an n-type transistor generally decreases with the extension length of the gate-strip. Because the extension length of a gate-strip depends upon the positions of the poly cut patterns intersecting the gate-strip pattern, the positions of the poly cut patterns in the layout design of a cell structure may influence the threshold voltage changes of the transistors. The threshold voltage changes of the transistors often influence the performance of the semiconductor cell structure implemented with the transistors. In some embodiments, systematic analysis and positioning of the poly cut patterns in a layout design improve the performance of the semiconductor cell structure.

FIGS. 1A-1B are partial layout diagrams of cell structures 100A and 100B, in accordance with some embodiments. In FIGS. 1A-1B, each of the cell structures 100A and 100B includes two n-type active zone patterns 182$n$ and 184$n$ extending in the X-direction and includes two p-type active zone patterns 182$p$ and 184$p$ extending in the X-direction. The two p-type active zone patterns 182$p$ and 184$p$ extending in the X-direction are between the two n-type active zone patterns 182$n$ and 184$n$. Each of the two p-type active zone patterns 182$p$ and 184$p$ specifies a p-type active zone for fabricating PMOS transistors. In some embodiments, the fabricated PMOS transistors have channel regions, source regions, and drain regions aligned within the p-type active zone as specified by the corresponding p-type active zone pattern in layout designs. Each of the two n-type active zone patterns 182$n$ and 184$n$ specifies an n-type active zone for fabricating NMOS transistors. In some embodiments, the fabricated NMOS transistors have channel regions, source regions, and drain regions aligned within the n-type active zone as specified by the corresponding n-type active zone pattern in layout designs.

In FIGS. 1A-1B, each of the cell structures 100A and 100B is bounded between two cell boundaries 191 and 199 extending in the Y-direction. Each of the cell structures 100A and 100B includes a gate-strip pattern 150 extending in the Y-direction. The gate-strip pattern 150 intersects the two n-type active zone patterns 182$n$ and 184$n$ and the two p-type active zone patterns 182$p$ and 184$p$. The intersection between the gate-strip pattern 150 and the two n-type active zone patterns 182$n$ and 184$n$ specifies the channel regions of two NMOS transistors. The intersection between the gate-strip pattern 150 and the two p-type active zone patterns 182$p$ and 184$p$ specifies the channel regions of two PMOS transistors. In FIGS. 1A-1B, the gate-strip pattern 150 in the cell structures 100A and 100B is provided as an example. In alternative embodiments, a cell structure often includes two or more gate-strip patterns extending in the Y-direction intersecting various active zone patterns, which specify the channel regions of various transistors. In FIGS. 1A-1B, each of the cell structures 100A and 100B also includes two dummy gate-strip patterns 151 and 159 extending in the Y-direction at the cell boundaries 191 and 199. In some embodiments, there are no channel regions of functioning transistors at the intersections between the dummy gate-strip patterns (151 and 159) and the active zone patterns (182$n$, 184$n$, 182$p$, and 184$p$). In some embodiments, the channel regions, the source regions, and the drain regions in the active zones of the cell structures 100A and 100B—as specified by the active zone patterns (182$n$, 184$n$, 182$p$, and 184$p$) between the cell boundaries 191 and 199—are isolated at the dummy gate-strips from the active zones in adjacent cell structures at the other side of the cell boundaries 191 or 199.

In FIGS. 1A-1B, each of the cell structures 100A and 100B includes poly cut patterns 141 and 142 extending in the X-direction at the upper boundary 192 and the lower boundary 198 of the cell structures 100A and 100B. The poly-cut patterns 141 and 142 specify that the gate-strip corresponding to the gate-strip pattern 150 is terminated before the gate-strip reaches the upper boundary 192 or the lower boundary 198, which prevents the gate-strip from extending directly into the neighboring cells on the other side of the boundaries 192 or 198.

In FIG. 1A, the cell structure 100A includes a poly cut pattern 125 extending in the X-direction, at the middle of the cell structure 100A, with equal distance to the upper boundary 192 and the lower boundary 198. The poly-cut pattern 125 intersects the gate-strip pattern 150 and divide the gate-strip pattern 150 into two parts. The lower part of the gate-strip pattern 150 corresponds to a first gate-strip segment pattern 152, and the upper part of the gate-strip pattern 150 corresponds to a second gate-strip segment pattern 154. The first gate-strip segment pattern 152 intersects with the active zone patterns 182$p$ and 182$n$, which correspondingly specifies the channel regions of a PMOS transistor and an NMOS transistor in the lower half of the cell structure 100A. The second gate-strip segment pattern 154 intersects with the active zone patterns 184$p$ and 184$n$, which correspondingly specifies the channel regions of a PMOS transistor and an NMOS transistor in the upper half of the cell structure 100A.

In FIG. 1B, the cell structure 100B includes two poly cut patterns 121 and 129 extending in the X-direction. Each of the two poly cut patterns 121 and 129 is at the middle of the cell structure 100B, with equal distance to the upper boundary 192 and the lower boundary 198. Each of the dummy gate-strip patterns 151 and 159 is intersected by one of the two poly cut patterns 121 and 129. The gate-strip pattern 150 in FIG. 1B, however, is a continuous gate-strip pattern which is not intersected by any poly cut patterns within the cell structure 100B. The gate-strip pattern 150 corresponds to a continuous gate-strip that overlaps with the n-type zone patterns (182$n$ and 184$n$) and the p-type zone patterns (182$p$ and 184$p$) within the cell structure 100B.

In FIGS. 1A-1B, the overall performances of the cell structures 100A and 100B depend upon the poly extension effect, because the performances of the individual transistors depend upon the poly extension effect. In FIGS. 1A-1B, the PMOS transistor T182$p$ has the channel region specified by the intersection between the p-type active zone pattern 182$p$ and the gate-strip pattern 150, and the NMOS transistor T182$n$ has the channel region specified by the intersection between the n-type active zone pattern 182$n$ and the gate-strip pattern 150. The performance of the PMOS transistor T182$p$ in FIG. 1A depends upon the edge-to-edge distance D1 (between the p-type active zone pattern 182$p$ and the poly cut pattern 125) and the edge-to-edge distance D2 (between the p-type active zone pattern 182$p$ and the poly cut pattern 142). The performance of the NMOS transistor T182$n$ in FIG. 1A depends upon the edge-to-edge distance D3 (between the n-type active zone pattern 182$n$ and the poly cut pattern 125) and the edge-to-edge distance D4 (between the n-type active zone pattern 182$n$ and the poly cut pattern 142). The performance of the PMOS transistor T182$p$ in FIG. 1B depends upon the edge-to-edge distance D5 (between the p-type active zone pattern 182$p$ and the poly cut pattern 141) and the edge-to-edge distance D2 (between the p-type active zone pattern 182$p$ and the poly cut pattern 142). The performance of the NMOS transistor T182$n$ in FIG. 1B depends upon the edge-to-edge distance D6 (between the n-type active zone pattern 182$n$ and the poly cut pattern 141) and the edge-to-edge distance D4 (between the n-type active zone pattern 182$n$ and the poly cut pattern 142).

Figure 1D:
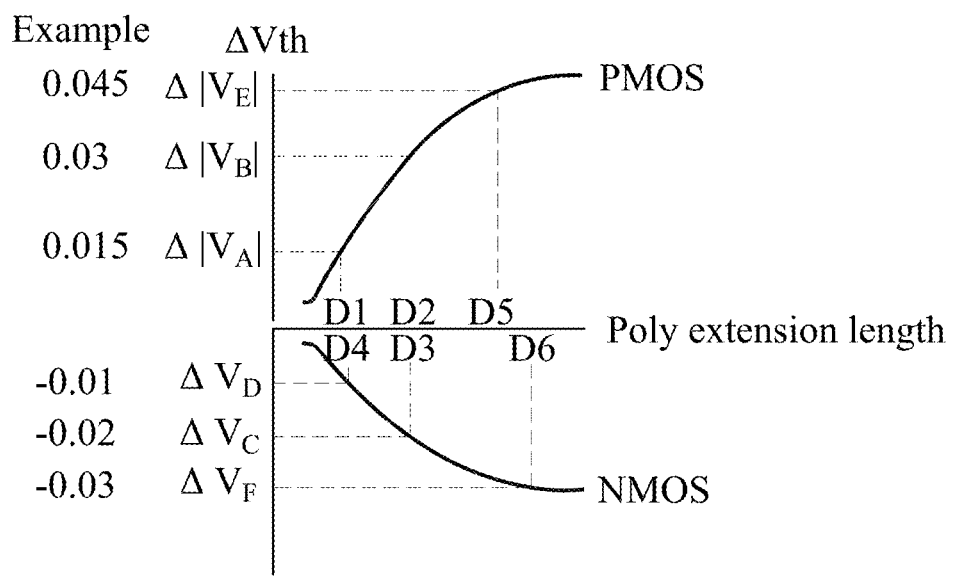

FIGS. 1C-1D are performance curves of individual transistors as functions of the poly extension length, in accordance with some embodiments. In FIG. 1C, the threshold voltage changes of a PMOS transistor and an NMOS transistor are plotted as a function of the poly extension length, in a design when the poly extension effect of the PMOS transistor is smaller than the poly extension effect of the NMOS transistor. The threshold voltage change of the PMOS transistor increases as the poly extension length increases, and the threshold voltage change of the NMOS transistor decreases as the poly extension length increases. For selected values of the poly extension length at D1, D2, and D5, the threshold voltage changes of the PMOS transistor are correspondingly equal to 0.01, 0.02, and 0.025. For selected values of the poly extension length at D4, D3, and D6, the threshold voltage changes of the NMOS transistor are correspondingly equal to −0.015, −0.03, and −0.05.

In FIG. 1D, the threshold voltage changes of a PMOS transistor and an NMOS transistor are plotted as a function of the poly extension length, in a design when the poly extension effect of the PMOS transistor is larger than the poly extension effect of the NMOS transistor. The threshold voltage change of the PMOS transistor increases as the poly extension length increases, and the threshold voltage change of the NMOS transistor decreases as the poly extension length increases. For selected values of the poly extension length at D1, D2, and D5, the threshold voltage changes of the PMOS transistor are correspondingly equal to 0.015, 0.03, and 0.045. For selected values of the poly extension length at D4, D3, and D6, the threshold voltage changes of the NMOS transistor are correspondingly equal to −0.01, −0.02, and −0.03. The comparisons of the performances of the individual transistors in FIG. 1C and in FIG. 1D generally indicates that one of the cell structures 100A and 100B has a better performance than the other one.

For the cell structure 100A in FIG. 1A, the total change of the threshold voltage of the PMOS transistor T182$p$ is related to the threshold voltage changes in the performance curves of FIGS. 1C-1D at values D1 and D2 of the poly extension length, and the total change of the threshold voltage of the NMOS transistor T182$n$ is related to the threshold voltage changes in the performance curves of FIGS. 1C-1D at values D4 and D3 of the poly extension length. If the poly extension effect of the PMOS transistor is larger than the poly extension effect of the NMOS transistor, as shown in FIG. 1C, the threshold voltage changes of the PMOS transistor T182$p$ are $\Delta|V_A|=0.01$ and $\Delta|V_B|=0.02$ correspondingly for values D1 and D2 of the poly extension length, and the threshold voltage changes of the NMOS transistor T182$n$ are $\Delta V_D=-0.015$ and $\Delta V_C=-0.03$ correspondingly for values D4 and D3 of the poly extension length. The total change of the threshold voltage of the PMOS transistor T182$p$ is $\Delta V_{PMOS} \approx (\Delta|V_A|+\Delta|V_B|)=0.03$, and the total change of the threshold voltage of the NMOS transistor T182$n$ is $\Delta V_{NMOS} \approx (\Delta V_D+\Delta V_C)=-0.045$. If the poly extension effect of the PMOS transistor is larger than the poly extension effect of the NMOS transistor, as shown in FIG. 1D, the threshold voltage changes of the PMOS transistor T182$p$ are $\Delta|V_A|=0.015$ and $\Delta|V_B|=0.03$ correspondingly for values D1 and D2 of the poly extension length, and the threshold voltage changes of the NMOS transistor T182$n$ are $\Delta V_D=-0.01$ and $\Delta V_C=-0.02$ correspondingly for values D4 and D3 of the poly extension length. The total change of the threshold voltage of the PMOS transistor T182$p$ is $\Delta V_{PMOS} \approx (\Delta|V_A|+\Delta|V_B|)=0.045$, and the total change of the threshold voltage of the NMOS transistor T182$n$ is $\Delta V_{NMOS} \approx (\Delta V_D+\Delta V_C)=-0.03$.

For the cell structure 100B in FIG. 1B, the total change of the threshold voltage of the PMOS transistor T182$p$ is related to the threshold voltage changes in the performance curves of FIGS. 1C-1D at values D5 and D2 of the poly extension length, and the total change of the threshold voltage of the NMOS transistor T182$n$ is related to the threshold voltage changes in the performance curves of FIGS. 1C-1D at values D4 and D6 of the poly extension length. If the poly extension effect of the PMOS transistor is smaller than the poly extension effect of the NMOS transistor, as shown in FIG. 1C, the threshold voltage changes of the PMOS transistor T182$p$ are $\Delta|V_E|=0.025$ and $\Delta|V_B|=0.02$ correspondingly for values D5 and D2 of the poly extension length, and the threshold voltage changes of the NMOS transistor T182$n$ are $\Delta V_D=-0.015$ and $\Delta V_F=-0.05$ correspondingly for values D4 and D6 of the poly extension length. The total change of the threshold voltage of the PMOS transistor T182$p$ is $\Delta V_{PMOS} \approx (\Delta|V_B|+|V_E|)=0.045$, and the total change of the threshold voltage of the NMOS transistor T182$n$ is $\Delta V_{NMOS} \approx (\Delta V_D+\Delta V_F)=-0.065$. If the poly extension effect of the PMOS transistor is larger than the poly extension effect of the NMOS transistor, as shown in FIG. 1D, the threshold voltage changes of the PMOS transistor T182$p$ are $\Delta|V_E|=0.045$ and $\Delta|V_B|=0.03$ correspondingly for values D5 and D2 of the poly extension length, and the threshold voltage changes of the NMOS transistor T182$n$ are $\Delta V_D=-0.01$ and $\Delta V_F=-0.03$ correspondingly for values D4 and D6 of the poly extension length. The total change of the threshold voltage of the PMOS transistor T182$p$ is $\Delta V_{PMOS} \approx (\Delta|V_B|+\Delta|V_E|)=0.075$, and the total change of the threshold voltage of the NMOS transistor T182$n$ is $\Delta V_{NMOS} \approx (\Delta V_D+\Delta V_F)=-0.04$.

When the poly extension effect of the PMOS transistor is smaller than the poly extension effect of the NMOS transistor, as in the example performance curve of FIG. 1C, the total change of the threshold voltages of the PMOS transistor T182$p$ are correspondingly 0.03 for the cell structure 100A and 0.045 for the cell structure 100B, and the total change of the threshold voltages of the NMOS transistor T182$n$ are correspondingly −0.045 for the cell structure 100A and −0.065 for the cell structure 100B. If the cell structure 100A is modified as the cell structure 100B by changing one or more poly cut patterns in the layout designs, the threshold voltage of the PMOS transistor T182$p$ will be increased by the total amount of 0.015 (which is the difference of 0.045 and 0.03), but the threshold voltage of the NMOS transistor T182$n$ will be decreased by the total amount of 0.020 (which is the difference of −0.065 and −0.045). When the total amount of decrease in the threshold voltage of the NMOS transistor T182$n$ is larger than the total amount of increase in the threshold voltage of the PMOS transistor T182$p$, an electric circuit constructed from the NMOS transistor T182$n$ and the PMOS transistor T182$p$ often has improved speed performance, when the cell structure 100A is changed to the cell structure 100B. Consequently, the cell structure 100B in FIG. 1B is preferable over the cell structure 100A in FIG. 1A in terms of the circuit performance, under the condition that the poly extension effect of the PMOS transistor is smaller than the poly extension effect of the NMOS transistor.

When the poly extension effect of the PMOS transistor is larger than the poly extension effect of the NMOS transistor, as in the example performance curve of FIG. 1D, the total change of the threshold voltages of the PMOS transistor T182$p$ are correspondingly 0.045 for the cell structure 100A and 0.075 for the cell structure 100B, and the total change of the threshold voltages of the NMOS transistor T182$n$ are correspondingly −0.03 for the cell structure 100A and −0.04 for the cell structure 100B. If the cell structure 100A is modified as the cell structure 100B by changing one or more poly cut patterns in the layout designs, the threshold voltage of the PMOS transistor T182p will be increased by the total amount of 0.030 (which is the difference of 0.075 and 0.045), but the threshold voltage of the NMOS transistor T182n will be decreased by the total amount of 0.010 (which is the difference of −0.04 and −0.03). When the total amount of decrease in the threshold voltage of the NMOS transistor T182n is smaller than the total amount of increase in the threshold voltage of the PMOS transistor T182p, an electric circuit constructed from the NMOS transistor T182n and the PMOS transistor T182p often has reduced speed performance, when the cell structure 100A is changed to the cell structure 100B. Consequently, the cell structure 100A in FIG. 1A is preferable over the cell structure 100B in FIG. 1B in terms of the circuit performance, under the condition that the poly extension effect of the PMOS transistor is larger than the poly extension effect of the NMOS transistor.

In FIGS. 1A-1B, the two p-type active zone patterns 182p and 184p in the cell structures 100A and 100B are between the two n-type active zone patterns 182n and 184n. In alternative layout designs, the cell structures include two n-type active zone patterns extending in the X-direction and two p-type active zone patterns extending in the X-direction, and the two n-type active zone patterns in the cell structures are between the two p-type active zone patterns.

FIGS. 2A-2B are partial layout diagrams of cell structures 200A and 200B, in accordance with some embodiments. Similar to the cell structures 100A and 100B in FIGS. 1A-1B, each of the cell structures 200A and 200B in FIGS. 2A-2B includes two n-type active zone patterns 282n and 284n extending in the X-direction and two p-type active zone patterns 282p and 284p extending in the X-direction. Unlike the cell structures 100A and 100B in FIGS. 1A-1B, however, the two n-type active zone patterns 282n and 284n in FIGS. 2A-2B are between the two p-type active zone patterns 282p and 284p. In comparison, the two p-type active zone patterns 182p and 184p in FIGS. 1A-1B are between the two n-type active zone patterns 182n and 184n. Similar to the cell structures 100A and 100B in FIGS. 1A-1B, each of the cell structures 200A and 200B in FIGS. 2A-2B includes a gate-strip pattern 250 which intersects the two n-type active zone patterns (282n and 284n) and the two p-type active zone patterns (282p and 284p). In FIGS. 2A-2B, the gate-strip pattern 250 in the cell structures 200A and 200B is provided as an example. In alternative embodiments, a cell structure often includes two or more gate-strip patterns extending in the Y-direction intersecting various active zone patterns, which specify the channel regions of various transistors. Similar to the cell structures 100A and 100B in FIGS. 1A-1B, each of the cell structures 200A and 200B in FIGS. 2A-2B also includes dummy gate-strip patterns 251 and 259 extending in the Y-direction at the cell boundaries 291 and 299.

In FIGS. 2A-2B, each of the cell structures 200A and 200B includes poly cut patterns 241 and 242 extending in the X-direction at the upper boundary and the lower boundary of the cell structures. In FIG. 2A, the cell structure 200A includes a poly cut pattern 225 extending in the X-direction, at the middle of the cell structure 200A. The poly-cut pattern 225 intersects the gate-strip pattern 250 and divide the gate-strip pattern 250 into two parts. The lower part of the gate-strip pattern 250 corresponds to a first gate-strip segment pattern 252, and the upper part of the gate-strip pattern 250 corresponds to a second gate-strip segment pattern 254. The first gate-strip segment pattern 252 intersects with the active zone patterns 282n and 282p, and the second gate-strip segment pattern 254 intersects with the active zone patterns 284p and 284n. In FIG. 2B, the cell structure 200B includes two poly cut patterns 221 and 229 extending in the X-direction. Each of the two poly cut patterns 221 and 229 is at the middle of the cell structure 200B. Each of the dummy gate-strip patterns 251 and 259 is intersected by one of the two poly cut patterns 221 and 229. The gate-strip pattern 250 in FIG. 2B, however, is a continuous gate-strip pattern which is not intersected by any poly cut patterns within the cell structure 200B. The gate-strip pattern 250 corresponds to a continuous gate-strip that overlaps with the n-type zone patterns (282n and 284n) and the p-type zone patterns (282p and 284p) within the cell structure 200B.

In FIGS. 2A-2B, the overall performances of the cell structures 200A and 200B depend upon the poly extension effect, because the performances of the individual transistors depend upon the poly extension effect. In FIGS. 2A-2B, the NMOS transistor T282n has the channel region specified by the intersection between the n-type active zone pattern 282n and the gate-strip pattern 250, and the PMOS transistor T282p has the channel region specified by the intersection between the p-type active zone pattern 282p and the gate-strip pattern 250. The performance of the NMOS transistor T282n in FIG. 2A depends upon the edge-to-edge distance S1 (between the n-type active zone pattern 282n and the poly cut pattern 225) and the edge-to-edge distance S2 (between the n-type active zone pattern 282n and the poly cut pattern 242). The performance of the PMOS transistor T282p in FIG. 2A depends upon the edge-to-edge distance S3 (between the p-type active zone pattern 282p and the poly cut pattern 225) and the edge-to-edge distance S4 (between the p-type active zone pattern 282p and the poly cut pattern 242). The performance of the NMOS transistor T282n in FIG. 2B depends upon the edge-to-edge distance S5 (between the n-type active zone pattern 282n and the poly cut pattern 241) and the edge-to-edge distance S2 (between the n-type active zone pattern 282n and the poly cut pattern 242). The performance of the PMOS transistor T282p in FIG. 2B depends upon the edge-to-edge distance S6 (between the p-type active zone pattern 282p and the poly cut pattern 241) and the edge-to-edge distance S4 (between the p-type active zone pattern 282p and the poly cut pattern 242).

Figure 2C:
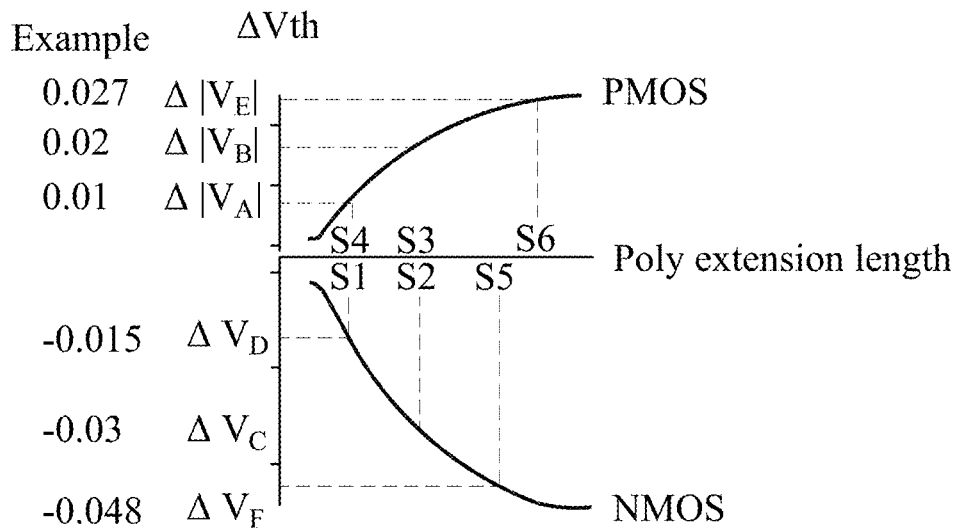
FIGS. 2C-2D are performance curves of individual transistors, in accordance with some embodiments.
Figure 2D:
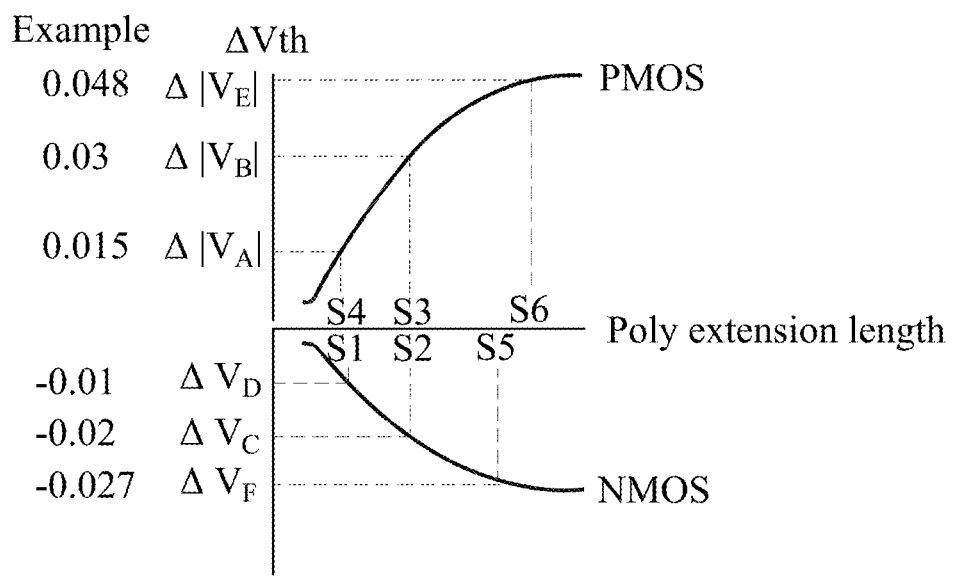

FIGS. 2C-2D are performance curves of individual transistors as functions of the poly extension length, in accordance with some embodiments. In FIG. 2C, the threshold voltage changes of a PMOS transistor and an NMOS transistor are plotted as a function of the poly extension length, in a design when the poly extension effect of the PMOS transistor is smaller than the poly extension effect of the NMOS transistor. The threshold voltage change of the PMOS transistor increases as the poly extension length increases, and the threshold voltage change of the NMOS transistor decreases as the poly extension length increases. For selected values of the poly extension length at S4, S3, and S6, the threshold voltage changes of the PMOS transistor are correspondingly equal to 0.01, 0.02, and 0.027. For selected values of the poly extension length at S1, S2, and S5, the threshold voltage changes of the NMOS transistor are correspondingly equal to −0.015, −0.03, and −0.048.

In FIG. 2D, the threshold voltage changes of a PMOS transistor and an NMOS transistor are plotted as a function of the poly extension length, in a design when the poly extension effect of the PMOS transistor is larger than the poly extension effect of the NMOS transistor. The threshold voltage change of the PMOS transistor increases as the poly extension length increases, and the threshold voltage change of the NMOS transistor decreases as the poly extension length increases. For selected values of the poly extension length at S4, S3, and S6, the threshold voltage changes of the PMOS transistor are correspondingly equal to 0.015, 0.03, and 0.048. For selected values of the poly extension length at S1, S2, and S5, the threshold voltage changes of the NMOS transistor are correspondingly equal to −0.01, −0.02, and −0.027. The comparisons of the performances of the individual transistors in FIG. 2C and in FIG. 2D generally indicates that one of the cell structures 200A and 200B has a better performance than the other one.

For the cell structure 200A in FIG. 2A, the total change of the threshold voltage of the NMOS transistor T282n is related to the threshold voltage changes in the performance curves of FIGS. 2C-2D at values S1 and S2 of the poly extension length, and the total change of the threshold voltage of the PMOS transistor T282p is related to the threshold voltage changes in the performance curves of FIG. 2C-2D at values S4 and S3 of the poly extension length. If the poly extension effect of the PMOS transistor is smaller than the poly extension effect of the NMOS transistor, as shown in FIG. 2C, the threshold voltage changes of the NMOS transistor T282n are $\Delta V_D$=−0.015 and $\Delta V_C$=−0.03 correspondingly for values S1 and S2 of the poly extension length, and the threshold voltage changes of the PMOS transistor T282p are $\Delta|V_A|$=0.01 and $\Delta|V_B|$=0.02 correspondingly for values S4 and S3 of the poly extension length. The total change of the threshold voltage of the NMOS transistor T282n is $\Delta V_{NMOS} \approx (\Delta V_D + \Delta V_C)$=−0.045, and the total change of the threshold voltage of the PMOS transistor T282p is $\Delta V_{PMOS} \approx (\Delta|V_A| + \Delta|V_B|)$=0.03. If the poly extension effect of the PMOS transistor is larger than the poly extension effect of the NMOS transistor, as shown in FIG. 2D, the threshold voltage changes of the NMOS transistor T282n are $\Delta V_D$=−0.01 and $\Delta V_C$=−0.02 correspondingly for values S1 and S2 of the poly extension length, and the threshold voltage changes of the PMOS transistor T282p are $\Delta|V_A|$=0.015 and $\Delta|V_B|$=0.03 correspondingly for values S4 and S3 of the poly extension length. The total change of the threshold voltage of the NMOS transistor T282n is $\Delta V_{NMOS} \approx (\Delta V_D + \Delta V_C)$=−0.03, and the total change of the threshold voltage of the PMOS transistor T282p is $\Delta V_{PMOS} \approx (\Delta|V_A| + \Delta|V_B|)$=0.045.

For the cell structure 200B in FIG. 2B, the total change of the threshold voltage of the NMOS transistor T282n is related to the threshold voltage changes in the performance curves of FIGS. 2C-2D at values S2 and S5 of the poly extension length, and the total change of the threshold voltage of the PMOS transistor T282p is related to the threshold voltage changes in the performance curves of FIGS. 2C-2D at values S4 and S6 of the poly extension length. If the poly extension effect of the PMOS transistor is smaller than the poly extension effect of the NMOS transistor, as shown in FIG. 2C, the threshold voltage changes of the NMOS transistor T282n are $\Delta V_C$=−0.03 and $\Delta V_F$=−0.048 correspondingly for values S2 and S5 of the poly extension length, and the threshold voltage changes of the PMOS transistor T282p are $\Delta|V_A|$=0.01 and $\Delta|V_E|$=0.027 correspondingly for values S4 and S6 of the poly extension length. The total change of the threshold voltage of the NMOS transistor T282n is $\Delta V_{NMOS} \approx (\Delta V_C + \Delta V_F)$=−0.078, and the total change of the threshold voltage of the PMOS transistor T282p is $\Delta V_{PMOS} \approx (\Delta|V_A| + \Delta|V_E|)$=0.037. If the poly extension effect of the PMOS transistor is larger than the poly extension effect of the NMOS transistor, as shown in FIG. 2D, the threshold voltage changes of the NMOS transistor T282n are $\Delta V_C$=−0.02 and $\Delta V_F$=−0.027 correspondingly for values S2 and S5 of the poly extension length, and the threshold voltage changes of the PMOS transistor T282p correspondingly are $\Delta|V_A|$=0.015 and $\Delta|V_E|$=0.048 for values S4 and S6 of the poly extension length. The total change of the threshold voltage of the NMOS transistor T282n is $\Delta V_{NMOS} \approx (\Delta V_C + \Delta V_F)$=−0.047, and the total change of the threshold voltage of the PMOS transistor T282p is $\Delta V_{PMOS} \approx (\Delta|V_A| + \Delta|V_E|)$=0.063.

When the poly extension effect of the PMOS transistor is smaller than the poly extension effect of the NMOS transistor, the total change of the threshold voltages of the PMOS transistor T282p are correspondingly 0.03 for the cell structure 200A and 0.037 for the cell structure 200B, and the total change of the threshold voltages of the NMOS transistor T282n are correspondingly −0.045 for the cell structure 200A and −0.078 for the cell structure 200B. If the cell structure 200A is modified as the cell structure 200B by changing one or more poly cut patterns in the layout designs, the threshold voltage of the PMOS transistor T282p will be increased by the total amount of 0.007 (which is the difference of 0.037 and 0.03), but the threshold voltage of the NMOS transistor T282n will be decreased by the total amount of 0.033 (which is the difference of −0.078 and −0.045). When the total amount of decrease in the threshold voltage of the NMOS transistor T282n is larger than the total amount of increase in the threshold voltage of the PMOS transistor T282p, an electric circuit constructed from the NMOS transistor T282n and the PMOS transistor T282p often has improved speed performance by changing the cell structure 200A to the cell structure 200B. Consequently, the cell structure 200B in FIG. 2B is preferable than the cell structure 200A in FIG. 2A in terms of the circuit performance, under the condition that the poly extension effect of the PMOS transistor is smaller than the poly extension effect of the NMOS transistor.

When the poly extension effect of the PMOS transistor is larger than the poly extension effect of the NMOS transistor, the total change of the threshold voltages of the PMOS transistor T282p are correspondingly 0.045 for the cell structure 200A and 0.063 for the cell structure 200B, and the total change of the threshold voltages of the NMOS transistor T282n are correspondingly −0.03 for the cell structure 200A and −0.048 for the cell structure 200B. If the cell structure 200A is modified as the cell structure 200B by changing one or more poly cut patterns in the layout designs, the threshold voltage of the PMOS transistor T282p will be increased by the total amount of 0.018 (which is the difference of 0.063 and 0.045), but the threshold voltage of the NMOS transistor T282n will be decreased by the total amount of 0.017 (which is the difference of −0.047 and −0.03). When the total amount of decrease in the threshold voltage of the NMOS transistor T282n is smaller than the total amount of increase in the threshold voltage of the PMOS transistor T282p, an electric circuit constructed from the NMOS transistor T282n and the PMOS transistor T282p often has reduced speed performance by changing the cell structure 200A to the cell structure 200B. Consequently, the cell structure 200A in FIG. 2A is preferable than the cell structure 200B in FIG. 2B in terms of the circuit performance, under the condition that the poly extension effect of the PMOS transistor is larger than the poly extension effect of the NMOS transistor.

When the poly extension effect of the PMOS transistor is equal to the poly extension effect of the NMOS transistor, in some embodiments, the layout designs in FIGS. 3A-3D are compared for selecting the layout design having better performance. FIGS. 3A-3D are partial layout diagrams of cell structures 300A-300D, in accordance with some embodiments. Each of the cell structures 300A-300D in FIGS. 3A-3D includes two n-type active zone patterns 382n and 384n extending in the X-direction and two p-type active zone patterns 382p and 384p extending in the X-direction. In FIGS. 3A-3D, the two p-type active zone patterns 382p and 384p are between the two n-type active zone patterns 382n and 384n. In alternative embodiments, the layout designs of FIGS. 3A-3D are modified such that the two n-type active zone patterns 382n and 384n are between the two p-type active zone patterns 382p and 384p. In FIGS. 3A-3D, each of the cell structures 300A-300D includes a gate-strip pattern 350 which intersects the two n-type active zone patterns (382n and 384n) and the two p-type active zone patterns (382p and 384p). Each of the cell structures 300A-300D also includes dummy gate-strip patterns 351 and 359 extending in the Y-direction at the cell boundaries 391 and 399. The gate-strip pattern 350 in the cell structures 300A-300D is provided as an example. In alternative embodiments, a cell structure often includes two or more gate-strip patterns extending in the Y-direction intersecting various active zone patterns, which specify various channel regions of corresponding transistors.

In FIGS. 3A-3D, each of the cell structures 300A-300D includes poly cut patterns 341 and 342 extending in the X-direction at the upper boundary and the lower boundary of the cell structures. Each of the cell structures 300A-300D includes two poly cut patterns 321 and 329 extending in the X-direction at the middle of the cell structure 300A-300D. Each of the dummy gate-strip patterns 351 and 359 is intersected by one of the two poly cut patterns 321 and 329.

Figures 3A, 3B, 3C, 3D:
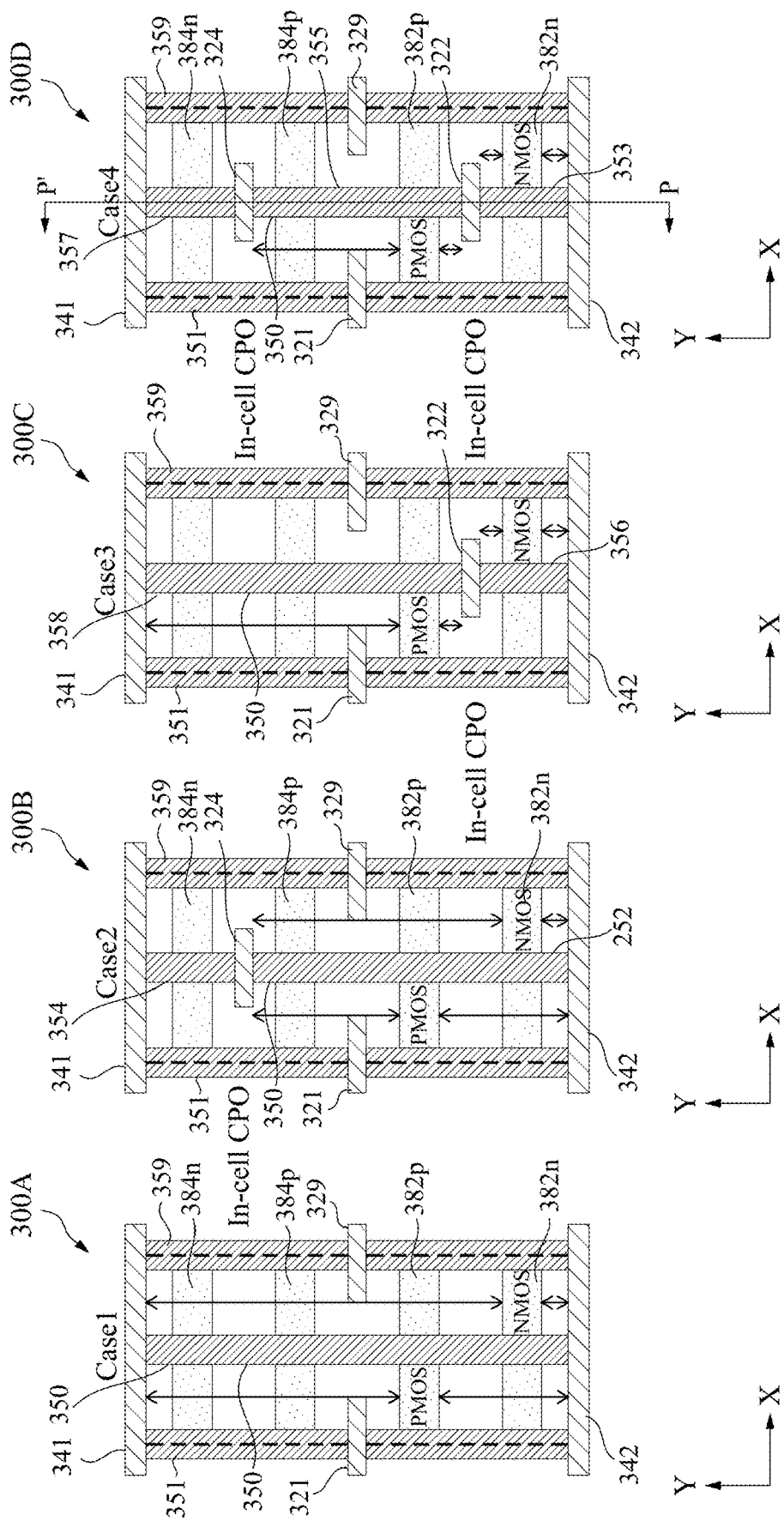
FIGS. 3A-3D are partial layout diagrams of cell structures, in accordance with some embodiments.

In FIG. 3A, the gate-strip pattern 350 is a continuous gate-strip pattern which is not intersected by any poly cut patterns within the cell structure 300A. The gate-strip pattern 350 corresponds to a continuous gate-strip that overlaps with the n-type zone patterns (382n and 384n) and the p-type zone patterns (382p and 384p) within the cell structure 300A.

In FIG. 3B, the cell structure 300B includes a poly cut pattern 324 extending in the X-direction, at the upper half of the cell structure 300B. The poly-cut pattern 324 intersects the gate-strip pattern 350 and divide the gate-strip pattern 350 into two parts. The lower part of the gate-strip pattern 350 corresponds to a first gate-strip segment pattern 352, and the upper part of the gate-strip pattern 350 corresponds to a second gate-strip segment pattern 354. The first gate-strip segment pattern 352 intersects the active zone patterns 384p, 382p, and 382n, and the second gate-strip segment pattern 354 intersects the active zone patterns 384n.

In FIG. 3C, the cell structure 300C includes a poly cut pattern 322 extending in the X-direction, at the lower half of the cell structure 300C. The poly-cut pattern 322 intersects the gate-strip pattern 350 and divide the gate-strip pattern 350 into two parts. The lower part of the gate-strip pattern 350 corresponds to a first gate-strip segment pattern 356, and the upper part of the gate-strip pattern 350 corresponds to a second gate-strip segment pattern 358. The first gate-strip segment pattern 356 intersects the active zone pattern 382n, and the second gate-strip segment pattern 358 intersects the active zone patterns 384n, 384p, and 382p.

In FIG. 3D, the cell structure 300D includes two poly cut patterns 322 and 324 extending in the X-direction. The two poly-cut patterns 322 and 324 intersect the gate-strip pattern 350 and divide the gate-strip pattern 350 into three parts. The lower part of the gate-strip pattern 350 corresponds to a first gate-strip segment pattern 353, the middle part of the gate-strip pattern 350 corresponds to a second gate-strip segment pattern 355, and the upper part of the gate-strip pattern 350 corresponds to a third gate-strip segment pattern 357. The first gate-strip segment pattern 351 intersects the active zone pattern 382n. The second gate-strip segment pattern 355 intersects the active zone patterns 384p, and 382p. The third gate-strip segment pattern 357 intersects the active zone pattern 384n.

When the poly extension effect of the PMOS transistor is equal to the poly extension effect of the NMOS transistor, in some embodiments, the cell structure 300D is selected as having better performance than the cell structures 300A, 300B, and 300C. The cell structure 300D often has better performance than the cell structures 300B-300C. The cell structures 300B-300C often have better performance than the cell structures 300A. The performances of the cell structure 300B and the cell structure 300C are often similar.

Figure 4A:
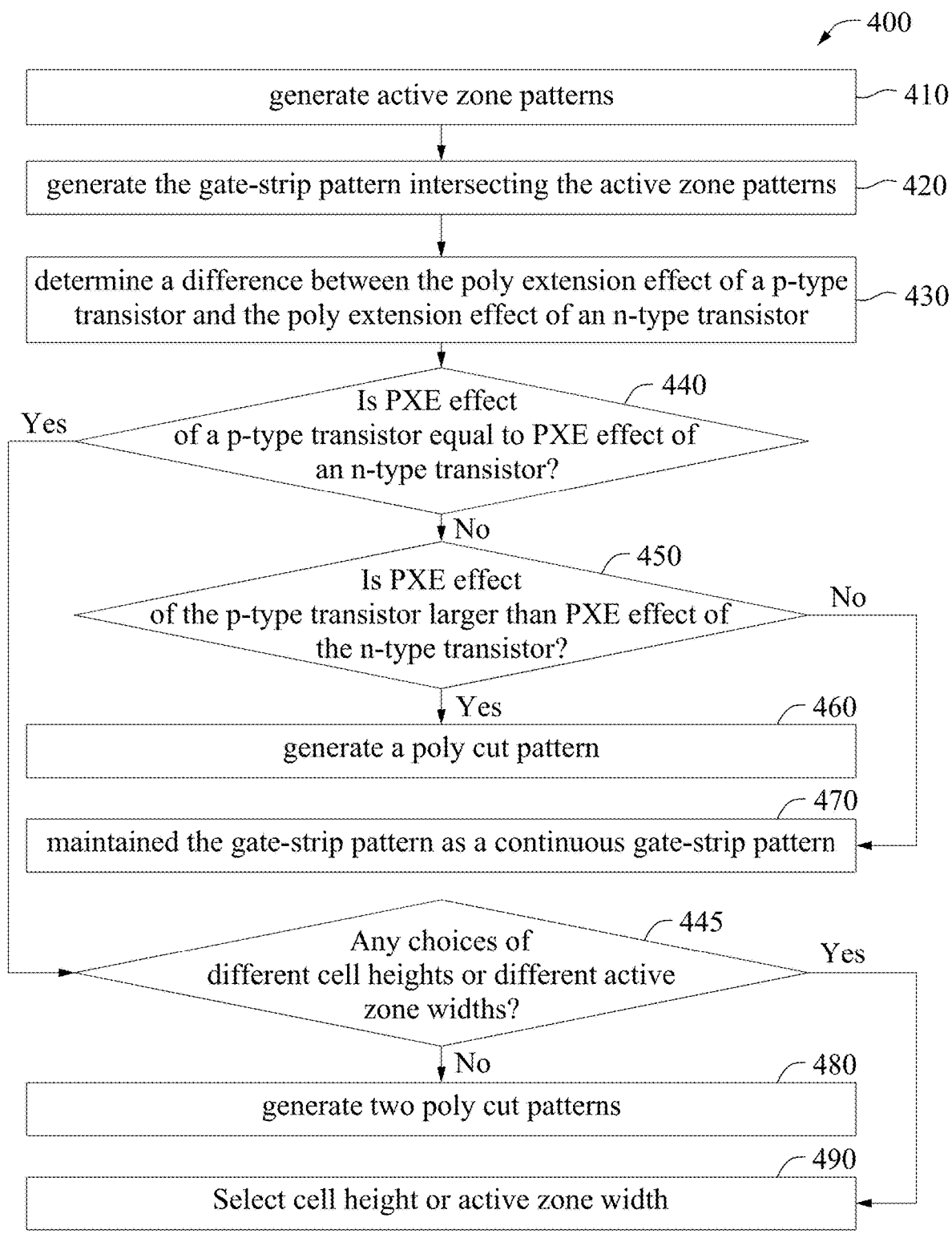
FIG. 4A is a flowchart of a method 400 of generating a layout design of an integrated circuit in accordance with some embodiments.

FIG. 4A is a flowchart of a method 400 of generating a layout design of an integrated circuit in accordance with some embodiments. It is understood that additional operations may be performed before, during, and/or after the method 400 depicted in FIG. 4A, and that some other processes may only be briefly described herein. In some embodiments, the method 400 is usable to generate one or more layout designs, such as the layout designs in FIGS. 1A-1B, FIGS. 2A-2B, or FIGS. 3A-3D. In some embodiments, method 400 is performed by a processing device (e.g., processor 802 in FIG. 8) configured to execute instructions for generating one or more layout designs, such as the layout designs in in FIGS. 1A-1B, FIGS. 2A-2B, or FIGS. 3A-3D.

In operation 410 of method 400, active zone patterns are generated. In some embodiments, as shown in FIGS. 1A-1B and FIGS. 2A-2B, the active zone patterns 182n, 184n, 182p, and 184p extending in the X-direction are generated. In embodiments of FIGS. 1A-1B, the p-type active zone patterns 182p and 184p extending in the X-direction are between the two n-type active zone patterns 182n and 184n. In embodiments of FIGS. 2A-2B, the two n-type active zone patterns extending in the X-direction are between the two p-type active zone patterns.

In operation 420 of method 400, one or more gate-strip patterns intersecting the active zone patterns are generated. In embodiments of FIGS. 1A-1B and FIGS. 2A-2B, the gate-strip pattern 150 are generated and the gate-strip pattern 150 intersects the active zone patterns 182n, 184n, 182p, and 184p.

In operation 430 of method 400, a difference between the poly extension effect of a p-type transistor and the poly extension effect of an n-type transistor is determined. In some embodiments, the figure of merit for characterizing the difference between the poly extension effect of a PMOS transistor and the poly extension effect of an NMOS transistor is determined based on the differences of the threshold voltage changes of the PMOS transistor and the NMOS transistor at selected poly extension lengths. In some embodiments, the figure of merit for characterizing the difference is the sum of all differences of the threshold voltage changes of the PMOS transistor and the NMOS transistor at selected poly extension lengths L1, L2, L3, . . . , and Ln, where n is an integer. The difference of the threshold voltage changes of the PMOS transistor and the NMOS transistor at the poly extension length Li is $\Delta V(Li)=(|\Delta V_{PMOS}(Li)|-|\Delta V_{NMOS}(Li)|)$, where $1 \le i \le n$. In some embodiments, the figure of merit, $\Delta PXE$, for characterizing the difference between the poly extension effect of a PMOS transistor and the poly extension effect of an NMOS transistor is $\Delta PXE = \Sigma_{i=1}^{i=n} \Delta V(Li)$.

As an example, in FIG. 1C and FIG. 1D, the differences of the threshold voltage changes of the PMOS transistor and the NMOS transistor at two selected poly extension lengths L1 and L2 are calculated. If L1=D1=D4 and L2=D2=D3, the differences of the threshold voltage changes of the PMOS transistor and the NMOS transistor at L1 and L2 are correspondingly $\Delta V(L1)=(\Delta|V_A|-|\Delta V_D|)$ and $\Delta V(L2)=(\Delta|V_B|-|\Delta V_C|)$. The figure of merit, $\Delta PXE$, for characterizing the difference between the poly extension effect of a PMOS transistor and the poly extension effect of an NMOS transistor is $\Delta PXE=\Delta V(L1)+\Delta V(L2)$. In FIG. 1C, the figure of merit, $\Delta PXE=-0.015$, is obtained based on $\Delta V_{L1}=-0.005$ and $\Delta V_{L2}=-0.01$. The negative value of the figure of merit, $\Delta PXE$, indicates that the poly extension effect of a PMOS transistor is smaller than the poly extension effect of an NMOS transistor, if $|\Delta PXE|$ is also larger than certain threshold value. In FIG. 1D, the figure of merit, $\Delta PXE=0.015$, is obtained based on $\Delta V_{L1}=0.005$ and $\Delta V_{L2}=0.01$. The positive value of the figure of merit, $\Delta PXE$, indicates that the poly extension effect of a PMOS transistor is larger than the poly extension effect of an NMOS transistor, if $|\Delta PXE|$ is also larger than certain threshold value.

In operation 440 of method 400, if the poly extension effect of the p-type transistor is equal to the poly extension effect of the n-type transistor, the process proceeds to operation 445. In some embodiments, the poly extension effect of the p-type transistor is equal to the poly extension effect of the n-type transistor, if an absolute value of the difference between the poly extension effect of the p-type transistor and the poly extension effect of the n-type transistor is less than a predetermined amount. In some embodiments, if $|\Delta PXE|<\delta$, the poly extension effect of the p-type transistor is equal to the poly extension effect of the n-type transistor, where the figure of merit $\Delta PXE$ is used to characterize the difference between the poly extension effects and is compared with the predetermined amount δ. In some embodiments, the poly extension effect of the p-type transistor is equal to the poly extension effect of the n-type transistor, if an absolute value of the difference between the poly extension effect of the p-type transistor and the poly extension effect of the n-type transistor is less than or equal to a predetermined amount. In some embodiments, if $|\Delta PXE|\leq\delta$, the poly extension effect of the p-type transistor is equal to the poly extension effect of the n-type transistor.

In operation 440 of method 400, if the poly extension effect of the p-type transistor is not equal to the poly extension effect of the n-type transistor, the process proceeds to operation 450. In some embodiments, the figure of merit $\Delta PXE$ is compared with the predetermined amount δ. In some embodiments, if $|\Delta PXE|\geq\delta$, the process proceeds to operation 450. In some embodiments, if $|\Delta PXE|>\delta$, the process proceeds to operation 450.

In operation 450 of method 400, if the poly extension effect of the p-type transistor is larger than the poly extension effect of the n-type transistor, the process proceeds to operation 460. In operation 450 of method 400, if the poly extension effect of the p-type transistor is smaller than the poly extension effect of the n-type transistor, the process proceeds to operation 470. In some embodiments, if $|\Delta PXE|\geq\delta$ and $\Delta PXE$ is positive, the process proceeds to operation 460, and if $|\Delta PXE|\geq\delta$ and $\Delta PXE$ is negative, the process proceeds to operation 470. In some embodiments, if $|\Delta PXE|>\delta$ and $\Delta PXE$ is positive, the process proceeds to operation 460, and if $|\Delta PXE|>\delta$ and $\Delta PXE$ is negative, the process proceeds to operation 470.

In operation 460 of method 400, a poly cut pattern intersecting the gate-strip pattern is generated. The combination of the poly cut pattern and the gate-strip pattern specifies a first gate-strip segment and a second gate-strip segment. In the embodiments of FIG. 1A, the combination of the poly cut pattern 125 and the gate-strip pattern 150 specifies a first gate-strip segment corresponding to the first gate-strip segment pattern 152 and a second gate-strip segment corresponding to the second gate-strip segment pattern 154. Similarly, in the embodiments of FIG. 2A, the combination of the poly cut pattern 225 and the gate-strip pattern 250 specifies a first gate-strip segment corresponding to the first gate-strip segment pattern 252 and a second gate-strip segment corresponding to the second gate-strip segment pattern 254.

In operation 470 of method 400, the gate-strip pattern is maintained as a continuous gate-strip pattern. In the embodiments of FIG. 1B, the gate-strip pattern 150 corresponds to a continuous gate-strip that overlaps with all four active zones specified by the active zone patterns 182p, 184p, 182n, and 184n. Similarly, in the embodiments of FIG. 2B, the gate-strip pattern 250 corresponds to a continuous gate-strip that overlaps with all four active zones specified by the active zone patterns 282p, 284p, 282n, and 284n.

Operations 460 and 470 are carried out when the poly extension effect of the p-type transistor is not equal to the poly extension effect of the n-type transistor. Operation 445 is performed when the poly extension effect of the p-type transistor is equal to the poly extension effect of the n-type transistor.

In operation 445 of method 400, if the layout design of a cell structure does not involve the selection from cell structures having different cell heights or different active zone widths, the process proceeds to operation 480 in which two poly cut patterns are generated. In the embodiments as shown in FIG. 3D, two poly-cut patterns 322 and 324 intersecting the gate-strip pattern 350 are generated in the cell structure 300D. The two poly-cut patterns 322 and 324 divide the gate-strip pattern 350 into three gate-strip segment patterns 353, 355, and 357.

Still in operation 445 of method 400, if the layout design of a cell structure involves the selection from cell structures having different cell heights or different active zone widths, the process proceeds to operation 490. In operation 490 of method 400, the cell structures having different cell heights or different active zone widths are compared in order to select the cell structure having the better performance. As an example, in FIGS. 5A-5C, the cell structures 500A-500C having different active zone widths are compared. As another example, in FIGS. 6A-6C, the cell structures 600A-600C having different cell heights are compared. As still another example, in FIGS. 7A-7C, the cell structures 700A-700C having different numbers of unit cell height are compared.

Figure 4B:
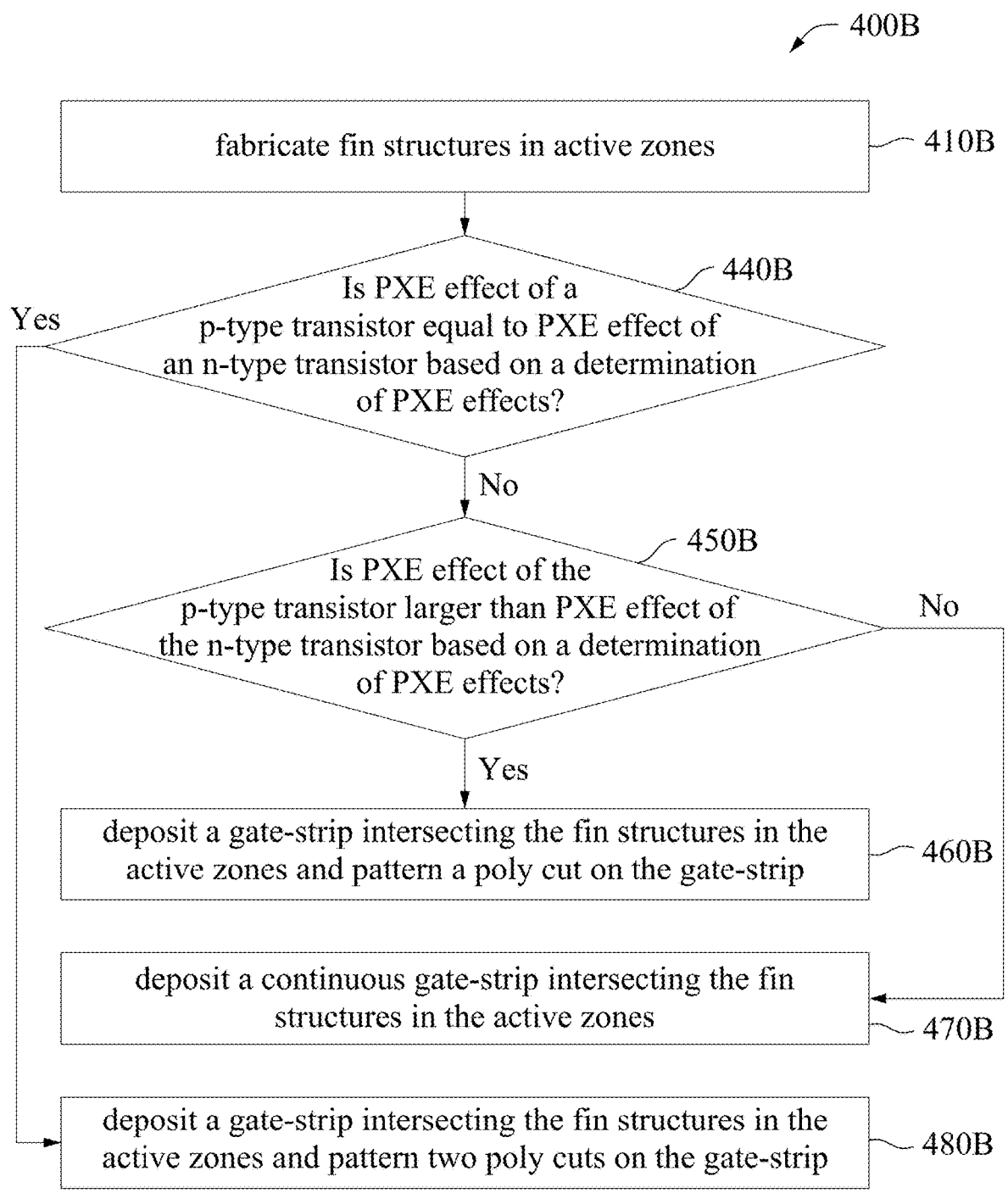
FIG. 4B is a flowchart of a method of fabricating an integrated circuit, in accordance with some embodiments.

FIG. 4B is a flowchart of a method 400B of fabricating an integrated circuit, in accordance with some embodiments. As a non-limiting example, the method 400B is used for fabricating an integrated circuit having FinFETs and having predetermined heights for individual cell structures and predetermined widths for the active zones as specified in layout diagrams of FIGS. 1A-1B and FIG. 3D. FIGS. 4C(1)-4C(5) are cross-sectional views of an integrated circuit along a cutting plan PP' (in one of FIGS. 1A-1B and FIG. 3D) at various stages of the fabrication following the flowchart of the method 400B in FIG. 4B, in accordance with some embodiments.

In operation 410B of method 400B, fin structures are fabricate in active zones. In some embodiments, as show in FIG. 4C(1), fin structures F182n, F182p, F184p, and F184n are fabricated on a substrate 80, as specified correspondingly by active zone patterns 182n, 182p, 184p, and 184n in the layout diagrams of FIGS. 1A-1B. The fin structures are examples of the semiconductor structures fabricated in the active zones. In alternative embodiments, other semiconductor structures, such as nano-sheets and/or nano-wires, are fabricated in the active zones.

In operation 440B of method 400B, based on a determination the poly extension effects of the transistors, if the poly extension effect of the p-type transistor is not equal to the poly extension effect of the n-type transistor, the process proceeds to operation 450B. In operation 450B of method 400B, based on a determination the poly extension effects of the transistors, if the poly extension effect of the p-type transistor is larger than the poly extension effect of the n-type transistor, the process proceeds to operation 460B. In operation 460B, a gate-strip is deposited intersecting the fin structures in the active zones, and then a poly cut is formed on the gate-strip following a mask pattern as specified by the poly-cut pattern 125 in FIG. 1A. In some embodiments, as shown in FIG. 4C(2), a gate-strip G150 is deposited, and the gate-strip G150 intersects the fin structures F182n, F182p, F184p, and F184n. Then, as shown in FIG. 4C(3), a poly cut C125 is formed on the gate-strip by a dry etching process. The poly cut C125 divides the gate-strip G150 into a first gate-strip segment G152 and a second gate-strip segment G154, which are correspondingly specified by the first gate-strip segment pattern 152 and the second gate-strip segment pattern 154 in the layout diagram of FIG. 1A. In FIG. 4C(3), the poly cuts C142 and C144 define the edges of the gate-strip G150.

In operation 450B of method 400B, if the poly extension effect of the p-type transistor is smaller than the poly extension effect of the n-type transistor, the process proceeds to operation 470B. In operation 470 of method 400, the gate-strip is maintained as a continuous gate-strip. In some embodiments, as shown in FIG. 4C(4), the deposited gate-strip G150 intersects the fin structures fin structures F182n, F182p, F184p, and F184n and maintained as a continuous gate-strip G150 following a mask pattern as specified in FIG. 1B, in which the edges of the continuous gate-strip G150 in FIG. 4C(4) are defined by the poly cuts C142 and C144.

After operation 430B, when operation 440B of method 400B is carried out, in a different situation, if the poly extension effect of the p-type transistor is equal to the poly extension effect of the n-type transistor, the process proceeds to operation 480B. In operation 480B, a gate-strip is deposited intersecting the fin structures in the active zones, and then two poly cuts are formed on the deposited gate-strip following a mask pattern as specified by the poly-cut patterns 324 and 322 in FIG. 3D. In some embodiments, as shown in FIG. 4C(5), two poly cuts C322 and 324 are formed on the deposited gate-strip. The poly-cuts C324 and C322 are specified by the poly-cut patterns 322 and 324 in FIG. 3D. The two poly cuts C322 and C324 divide the gate-strip into three parts: a first gate-strip segment G353, a second gate-strip segment G355, and a third gate-strip segment pattern G357. In FIG. 4C(5), the poly cut C342 defines an outer edge of the first gate-strip segment G353, and the poly cut C341 defines an outer edge of the third gate-strip segment G357.

Figures 5A, 5B, 5C:
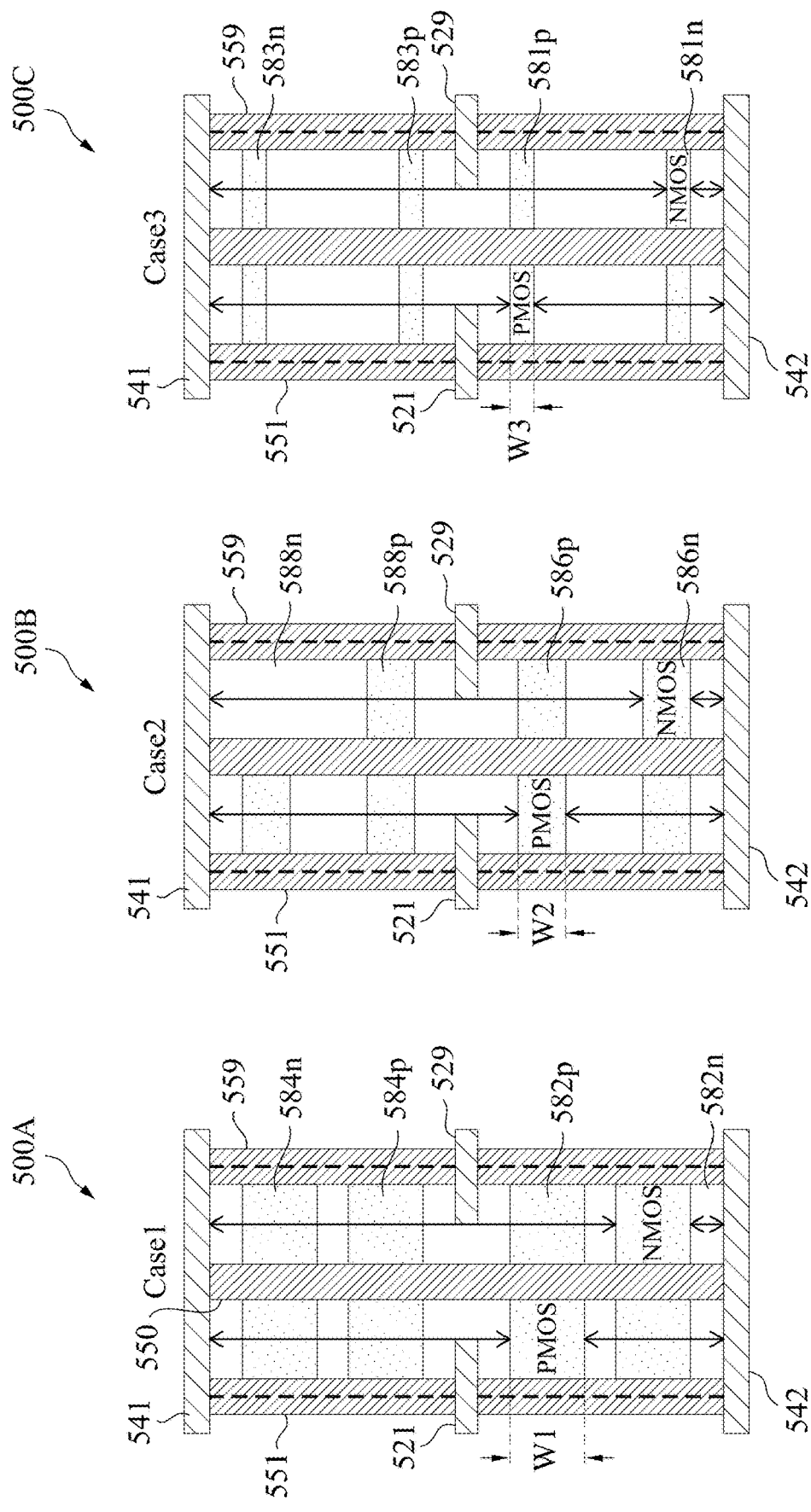
FIGS. 5A-5C are partial layout diagrams of cell structures having different active zone widths, in accordance with some embodiments.

FIGS. 5A-5C are partial layout diagrams of cell structures 500A-500C having different active zone widths, in accordance with some embodiments. Each of the cell structures 500A-500C includes two n-type active zone patterns and two p-type active zone patterns. Each of the cell structures 500A-500C includes a gate-strip pattern 550 and two dummy gate-strip patterns 551 and 559. Each of the cell structures 500A-500C includes poly cut patterns 541 and 542 correspondingly at the upper boundary and the lower boundary and includes two poly cut patterns 521 and 529 intersecting correspondingly the dummy gate-strip patterns 551 and 559. The gate-strip pattern 550 is a continuous gate-strip pattern which is not intersected by any poly cut patterns within the cell structures 500A-500C.

In the cell structure 500A of FIG. 5A, the gate-strip pattern 550 intersects the two n-type active zone patterns (582n and 584n) and the two p-type active zone patterns (582p and 584p). The active zone patterns in the cell structure 500A specify active zones having a first active zone width (e.g., W1). In the cell structure 500B of FIG. 5B, the gate-strip pattern 550 intersects the two n-type active zone patterns (586n and 588n) and the two p-type active zone patterns (586p and 588p). The active zone patterns in the cell structure 500B specify active zones having a second active zone width (e.g., W2). In the cell structure 500C of FIG. 5C, the gate-strip pattern 550 intersects the two n-type active zone patterns (581n and 583n) and the two p-type active zone patterns (581p and 583p). The active zone patterns in the cell structure 500C specify active zones having a third active zone width (e.g., W3). In FIGS. 5A-5C, the active zone widths satisfy the relationship W1>W2>W3. In some embodiments, different active zone widths specify different numbers of fins for the fin transistors fabricated with in the corresponding active zone. The current carrying capacity of the fin transistors often increases with the numbers of fins. The fin transistors having more fins often have improved performance. When the cell structures having different active zone widths are compared (for example, in operation 490 of method 400), the cell structure 500A often has improved performance over the cell structure 500B, and the cell structure 500B often has improved performance over the cell structure 500C. In operation 490 of method 400, the cell structure 500A is selected over alternative cell structures 500B and 500C.

Figures 6A, 6B, 6C:
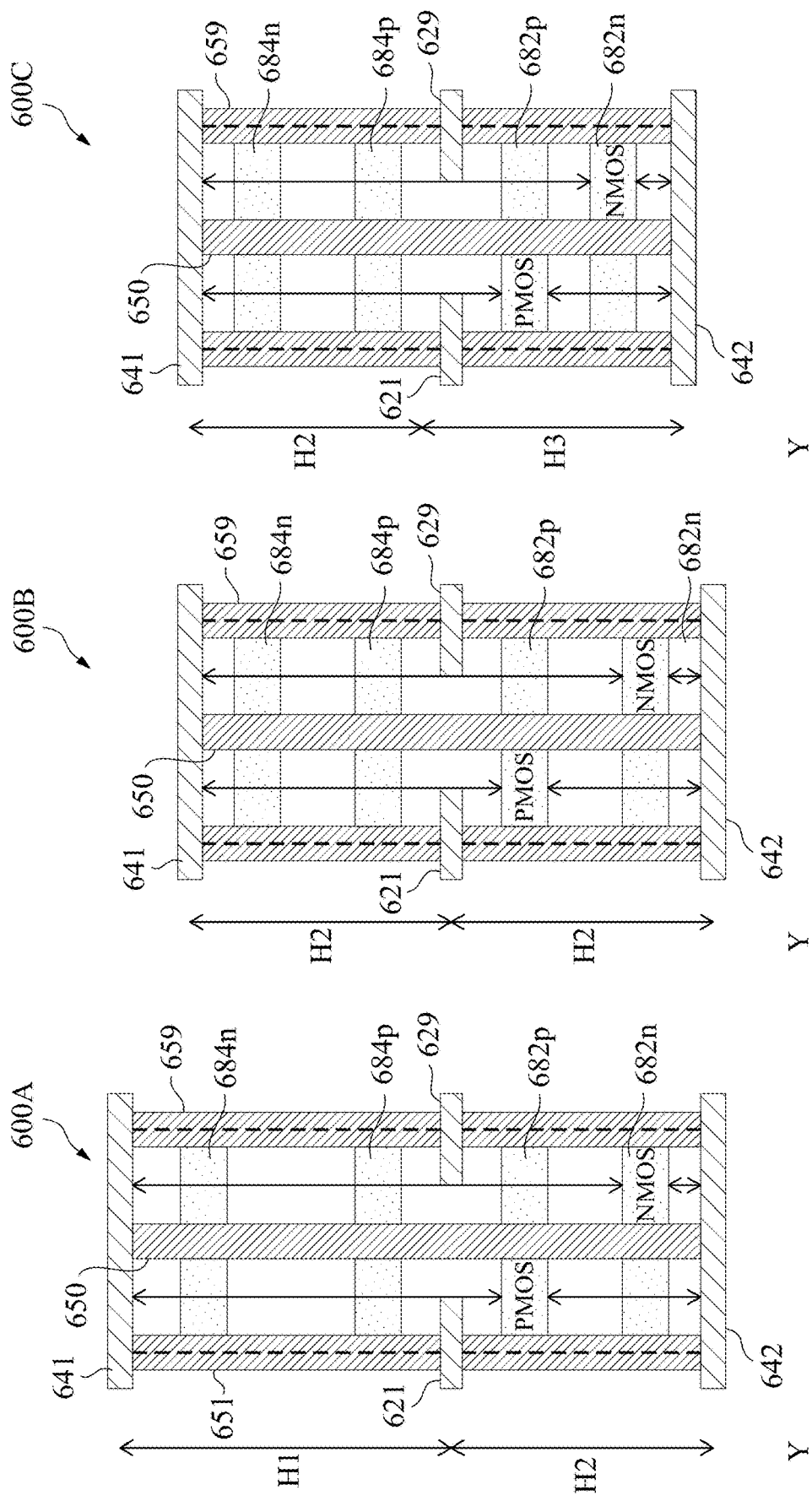
FIGS. 6A-6C are partial layout diagrams of cell structures having different cell heights, in accordance with some embodiments.

FIGS. 6A-6C are partial layout diagrams of cell structures 600A-600C having different cell heights, in accordance with some embodiments. Each of the cell structures 600A-600C includes two n-type active zone patterns (682n and 684n) and two p-type active zone patterns (682p and 684p). Each of the cell structures 600A-600C includes a gate-strip pattern 650 and two dummy gate-strip patterns 651 and 659. Each of the cell structures 600A-600C includes poly cut patterns 641 and 642 correspondingly at the upper boundary and the lower boundary and includes two poly cut patterns 621 and 629 intersecting correspondingly the dummy gate-strip patterns 651 and 659. The gate-strip pattern 650 is a continuous gate-strip pattern which is not intersected by any poly cut patterns within the cell structures 600A-600C.

The cell structures 600A, 600B, and 600C correspondingly have the cell heights 2H1, 2H2, and 2H3. In FIGS. 6A-6C, the cell heights satisfy the relationship 2H1>2H2>2H3. The length of the gate-strip specified by the gate-strip pattern 650 decreases when the cell height of the corresponding cell structure decreases. As the length of the gate-strip decreases, the poly resistance and stray capacitor associated with the gate-strip also decrease. When the cell structures having different cell heights are compared (for example, in operation 490 of method 400), the cell structure 600C often has improved performance over the cell structure 600B, and the cell structure 600B often has improved performance over the cell structure 600A. In operation 490 of method 400, the cell structure 600C is selected over alternative cell structures 600B and 600A.

Figures 7A, 7B, 7C:
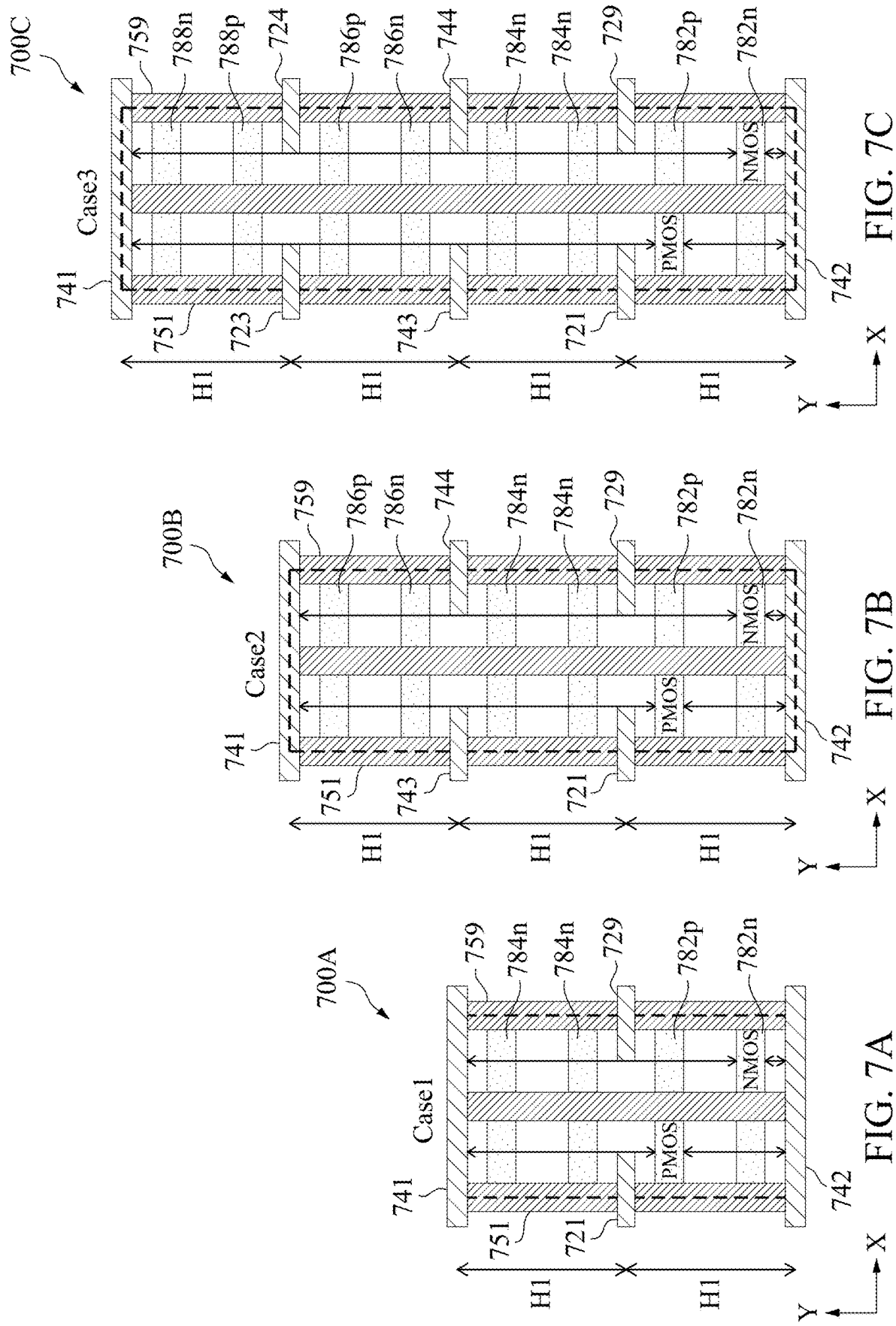
FIGS. 7A-7C are partial layout diagrams of cell structures having different numbers of unit cell height, in accordance with some embodiments.

FIGS. 7A-7C are partial layout diagrams of cell structures 700A-700C having different numbers of unit cell height, in accordance with some embodiments. Each of the cell structures 700A-700C includes a gate-strip pattern 750 and two dummy gate-strip patterns 751 and 759. Each of the cell structures 700A-700C includes poly cut patterns 741 and 742 correspondingly at the upper boundary and the lower boundary. In FIG. 7A, the cell structure 700A includes two n-type active zone patterns (782n and 784n) and two p-type active zone patterns (782p and 784p). The cell structure 700A includes two poly cut patterns 721 and 729 intersecting correspondingly the dummy gate-strip patterns 751 and 759. In FIG. 7B, the cell structure 700B includes three n-type active zone patterns (782n, 784n, and 786n) and three p-type active zone patterns (782p, 784p, and 786p). The cell structure 700B includes two poly cut patterns (721 and 743) intersecting correspondingly the dummy gate-strip pattern 751 and two poly cut patterns (729 and 744) intersecting correspondingly the dummy gate-strip pattern 759. In FIG. 7C, the cell structure 700C includes four n-type active zone patterns (782n, 784n, 786n, and 788n) and four p-type active zone patterns (782p, 784p, 786p, and 788p). The cell structure 700B includes three poly cut patterns (721, 743, and 723) intersecting correspondingly the dummy gate-strip pattern 751 and three poly cut patterns (729, 744, and 724) intersecting correspondingly the dummy gate-strip pattern 759.

In FIGS. 7A-7C, the gate-strip pattern 750 is a continuous gate-strip pattern which is not intersected by any poly cut patterns within the cell structures 700A-700C. The cell structures 700A, 700B, and 700C, measured in unit cell height H1, correspondingly have the cell heights 2H1, 3H1, and 4H1. The length of the gate-strip specified by the gate-strip pattern 750 increases when the cell height of the corresponding cell structure increases. As the length of the gate-strip increases, the poly resistance and stray capacitor associated with the gate-strip also increases. When the cell structures having different cell heights are compared (for example, in operation 490 of method 400), the cell structure 700A often has improved performance over the cell structure 700B, and the cell structure 700B often has improved performance over the cell structure 700C. In operation 490 of method 400, the cell structure 700A is selected over alternative cell structures 700B and 700C.

Figure 8:
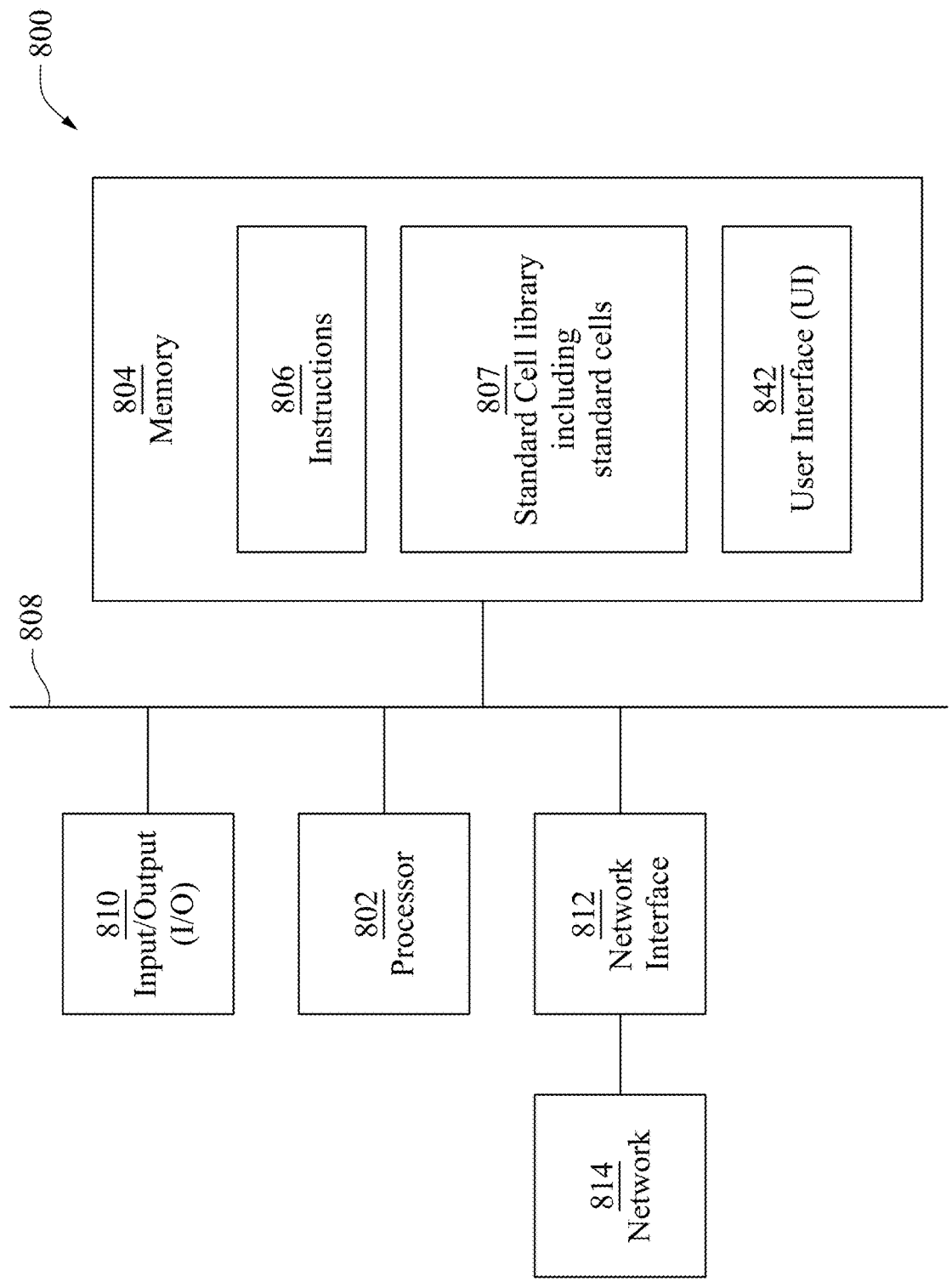
FIG. 8 is a block diagram of an electronic design automation (EDA) system, in accordance with some embodiments.

FIG. 8 is a block diagram of an electronic design automation (EDA) system 800 in accordance with some embodiments.

In some embodiments, EDA system 800 includes an APR system. Methods described herein of designing layout diagrams represent wire routing arrangements, in accordance with one or more embodiments, are implementable, for example, using EDA system 800, in accordance with some embodiments.

In some embodiments, EDA system 800 is a general purpose computing device including a hardware processor 802 and a non-transitory, computer-readable storage medium 804. Storage medium 804, amongst other things, is encoded with, i.e., stores, computer program code 806, i.e., a set of executable instructions. Execution of instructions 806 by hardware processor 802 represents (at least in part) an EDA tool which implements a portion or all of the methods described herein in accordance with one or more embodiments (hereinafter, the noted processes and/or methods).

Processor 802 is electrically coupled to computer-readable storage medium 804 via a bus 808. Processor 802 is also electrically coupled to an I/O interface 810 by bus 808. A network interface 812 is also electrically connected to processor 802 via bus 808. Network interface 812 is connected to a network 814, so that processor 802 and computer-readable storage medium 804 are capable of connecting to external elements via network 814. Processor 802 is configured to execute computer program code 806 encoded in computer-readable storage medium 804 in order to cause system 800 to be usable for performing a portion or all of the noted processes and/or methods. In one or more embodiments, processor 802 is a central processing unit (CPU), a multi-processor, a distributed processing system, an application specific integrated circuit (ASIC), and/or a suitable processing unit.

In one or more embodiments, computer-readable storage medium 804 is an electronic, magnetic, optical, electromagnetic, infrared, and/or a semiconductor system (or apparatus or device). For example, computer-readable storage medium 804 includes a semiconductor or solid-state memory, a magnetic tape, a removable computer diskette, a random access memory (RAM), a read-only memory (ROM), a rigid magnetic disk, and/or an optical disk. In one or more embodiments using optical disks, computer-readable storage medium 804 includes a compact disk-read only memory (CD-ROM), a compact disk-read/write (CD-R/W), and/or a digital video disc (DVD).

In one or more embodiments, storage medium 804 stores computer program code 806 configured to cause system 800 (where such execution represents (at least in part) the EDA tool) to be usable for performing a portion or all of the noted processes and/or methods. In one or more embodiments, storage medium 804 also stores information which facilitates performing a portion or all of the noted processes and/or methods. In one or more embodiments, storage medium 804 stores library 807 of standard cells including such standard cells as disclosed herein.

EDA system 800 includes I/O interface 810. I/O interface 810 is coupled to external circuitry. In one or more embodiments, I/O interface 810 includes a keyboard, keypad, mouse, trackball, trackpad, touchscreen, and/or cursor direction keys for communicating information and commands to processor 802.

EDA system 800 also includes network interface 812 coupled to processor 802. Network interface 812 allows system 800 to communicate with network 814, to which one or more other computer systems are connected. Network interface 812 includes wireless network interfaces such as BLUETOOTH, WIFI, WIMAX, GPRS, or WCDMA; or wired network interfaces such as ETHERNET, USB, or IEEE-1364. In one or more embodiments, a portion or all of noted processes and/or methods, is implemented in two or more systems 800.

System 800 is configured to receive information through I/O interface 810. The information received through I/O interface 810 includes one or more of instructions, data, design rules, libraries of standard cells, and/or other parameters for processing by processor 802. The information is transferred to processor 802 via bus 808. EDA system 800 is configured to receive information related to a UI through I/O interface 810. The information is stored in computer-readable medium 804 as user interface (UI) 842.

In some embodiments, a portion or all of the noted processes and/or methods is implemented as a standalone software application for execution by a processor. In some embodiments, a portion or all of the noted processes and/or methods is implemented as a software application that is a part of an additional software application. In some embodiments, a portion or all of the noted processes and/or methods is implemented as a plug-in to a software application. In some embodiments, at least one of the noted processes and/or methods is implemented as a software application that is a portion of an EDA tool. In some embodiments, a portion or all of the noted processes and/or methods is implemented as a software application that is used by EDA system 800. In some embodiments, a layout diagram which includes standard cells is generated using a tool such as VIRTUOSO® available from CADENCE DESIGN SYSTEMS, Inc., or another suitable layout generating tool.

In some embodiments, the processes are realized as functions of a program stored in a non-transitory computer readable recording medium. Examples of a non-transitory computer readable recording medium include, but are not limited to, external/removable and/or internal/built-in storage or memory unit, e.g., one or more of an optical disk, such as a DVD, a magnetic disk, such as a hard disk, a semiconductor memory, such as a ROM, a RAM, a memory card, and the like.

Figure 9:
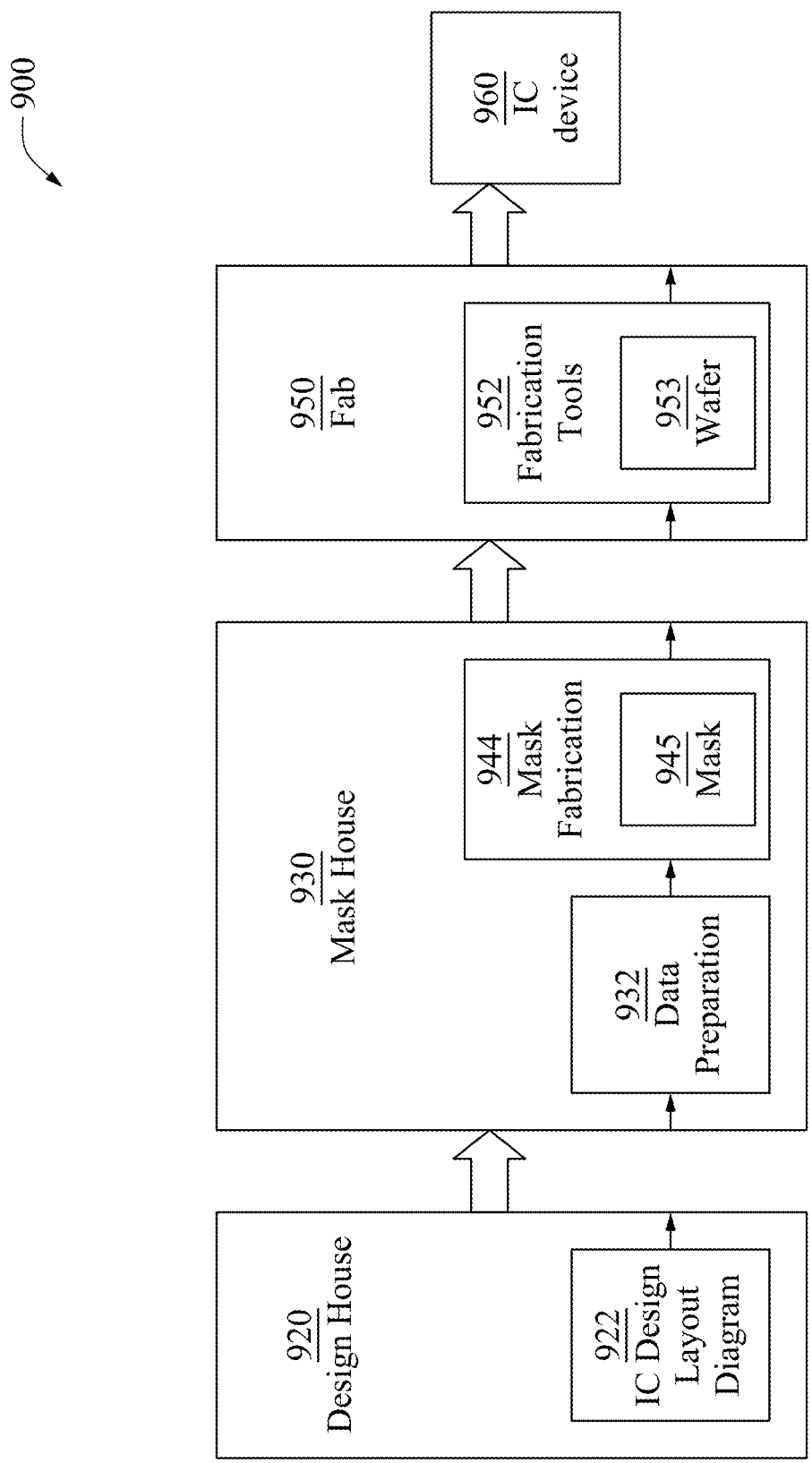
FIG. 9 is a block diagram of an integrated circuit (IC) manufacturing system, and an IC manufacturing flow associated therewith, in accordance with some embodiments.

FIG. 9 is a block diagram of an integrated circuit (IC) manufacturing system 900, and an IC manufacturing flow associated therewith, in accordance with some embodiments. In some embodiments, based on a layout diagram, at least one of (A) one or more semiconductor masks or (B) at least one component in a layer of a semiconductor integrated circuit is fabricated using manufacturing system 900.

In FIG. 9, IC manufacturing system 900 includes entities, such as a design house 920, a mask house 930, and an IC manufacturer/fabricator ("fab") 950, that interact with one another in the design, development, and manufacturing cycles and/or services related to manufacturing an IC device 960. The entities in system 900 are connected by a communications network. In some embodiments, the communications network is a single network. In some embodiments, the communications network is a variety of different networks, such as an intranet and the Internet. The communications network includes wired and/or wireless communication channels. Each entity interacts with one or more of the other entities and provides services to and/or receives services from one or more of the other entities. In some embodiments, two or more of design house 920, mask house 930, and IC fab 950 is owned by a single larger company. In some embodiments, two or more of design house 920, mask house 930, and IC fab 950 coexist in a common facility and use common resources.

Design house (or design team) 920 generates an IC design layout diagram 922. IC design layout diagram 922 includes various geometrical patterns designed for an IC device 960. The geometrical patterns correspond to patterns of metal, oxide, or semiconductor layers that make up the various components of IC device 960 to be fabricated. The various layers combine to form various IC features. For example, a portion of IC design layout diagram 922 includes various IC features, such as an active region, gate electrode, source and drain, metal lines or vias of an interlayer interconnection, and openings for bonding pads, to be formed in a semiconductor substrate (such as a silicon wafer) and various material layers disposed on the semiconductor substrate. Design house 920 implements a proper design procedure to form IC design layout diagram 922. The design procedure includes one or more of logic design, physical design or place and route. IC design layout diagram 922 is presented in one or more data files having information of the geometrical patterns. For example, IC design layout diagram 922 can be expressed in a GDSII file format or DFII file format.

Mask house 930 includes data preparation 932 and mask fabrication 944. Mask house 930 uses IC design layout diagram 922 to manufacture one or more masks 945 to be used for fabricating the various layers of IC device 960 according to IC design layout diagram 922. Mask house 930 performs mask data preparation 932, where IC design layout diagram 922 is translated into a representative data file ("RDF"). Mask data preparation 932 provides the RDF to mask fabrication 944. Mask fabrication 944 includes a mask writer. A mask writer converts the RDF to an image on a substrate, such as a mask (reticle) 945 or a semiconductor wafer 953. The design layout diagram 922 is manipulated by mask data preparation 932 to comply with particular characteristics of the mask writer and/or requirements of IC fab 950. In FIG. 9, mask data preparation 932 and mask fabrication 944 are illustrated as separate elements. In some embodiments, mask data preparation 932 and mask fabrication 944 can be collectively referred to as mask data preparation.

In some embodiments, mask data preparation 932 includes optical proximity correction (OPC) which uses lithography enhancement techniques to compensate for image errors, such as those that can arise from diffraction, interference, other process effects and the like. OPC adjusts IC design layout diagram 922. In some embodiments, mask data preparation 932 includes further resolution enhancement techniques (RET), such as off-axis illumination, sub-resolution assist features, phase-shifting masks, other suitable techniques, and the like or combinations thereof. In some embodiments, inverse lithography technology (ILT) is also used, which treats OPC as an inverse imaging problem.

In some embodiments, mask data preparation 932 includes a mask rule checker (MRC) that checks the IC design layout diagram 922 that has undergone processes in OPC with a set of mask creation rules which contain certain geometric and/or connectivity restrictions to ensure sufficient margins, to account for variability in semiconductor manufacturing processes, and the like. In some embodiments, the MRC modifies the IC design layout diagram 922 to compensate for limitations during mask fabrication 944, which may undo part of the modifications performed by OPC in order to meet mask creation rules.

In some embodiments, mask data preparation 932 includes lithography process checking (LPC) that simulates processing that will be implemented by IC fab 950 to fabricate IC device 960. LPC simulates this processing based on IC design layout diagram 922 to create a simulated manufactured device, such as IC device 960. The processing parameters in LPC simulation can include parameters associated with various processes of the IC manufacturing cycle, parameters associated with tools used for manufacturing the IC, and/or other aspects of the manufacturing process. LPC takes into account various factors, such as aerial image contrast, depth of focus ("DOF"), mask error enhancement factor ("MEEF"), other suitable factors, and the like or combinations thereof. In some embodiments, after a simulated manufactured device has been created by LPC, if the simulated device is not close enough in shape to satisfy design rules, OPC and/or MRC are be repeated to further refine IC design layout diagram 922.

It should be understood that the above description of mask data preparation 932 has been simplified for the purposes of clarity. In some embodiments, data preparation 932 includes additional features such as a logic operation (LOP) to modify the IC design layout diagram 922 according to manufacturing rules. Additionally, the processes applied to IC design layout diagram 922 during data preparation 932 may be executed in a variety of different orders.

After mask data preparation 932 and during mask fabrication 944, a mask 945 or a group of masks 945 are fabricated based on the modified IC design layout diagram 922. In some embodiments, mask fabrication 944 includes performing one or more lithographic exposures based on IC design layout diagram 922. In some embodiments, an electron-beam (e-beam) or a mechanism of multiple e-beams is used to form a pattern on a mask (photomask or reticle) 945 based on the modified IC design layout diagram 922. Mask 945 can be formed in various technologies. In some embodiments, mask 945 is formed using binary technology. In some embodiments, a mask pattern includes opaque regions and transparent regions. A radiation beam, such as an ultraviolet (UV) beam, used to expose the image sensitive material layer (e.g., photoresist) which has been coated on a wafer, is blocked by the opaque region and transmits through the transparent regions. In one example, a binary mask version of mask 945 includes a transparent substrate (e.g., fused quartz) and an opaque material (e.g., chromium) coated in the opaque regions of the binary mask. In another example, mask 945 is formed using a phase shift technology. In a phase shift mask (PSM) version of mask 945, various features in the pattern formed on the phase shift mask are configured to have proper phase difference to enhance the resolution and imaging quality. In various examples, the phase shift mask can be attenuated PSM or alternating PSM. The mask(s) generated by mask fabrication 944 is used in a variety of processes. For example, such a mask(s) is used in an ion implantation process to form various doped regions in semiconductor wafer 953, in an etching process to form various etching regions in semiconductor wafer 953, and/or in other suitable processes.

IC fab 950 is an IC fabrication business that includes one or more manufacturing facilities for the fabrication of a variety of different IC products. In some embodiments, IC Fab 950 is a semiconductor foundry. For example, there may be a manufacturing facility for the front end fabrication of a plurality of IC products (front-end-of-line (FEOL) fabrication), while a second manufacturing facility may provide the back end fabrication for the interconnection and packaging of the IC products (back-end-of-line (BEOL) fabrication), and a third manufacturing facility may provide other services for the foundry business.

IC fab 950 includes fabrication tools 952 configured to execute various manufacturing operations on semiconductor wafer 953 such that IC device 960 is fabricated in accordance with the mask(s), e.g., mask 945. In various embodiments, fabrication tools 952 include one or more of a wafer stepper, an ion implanter, a photoresist coater, a process chamber, e.g., a CVD chamber or LPCVD furnace, a CMP system, a plasma etch system, a wafer cleaning system, or other manufacturing equipment capable of performing one or more suitable manufacturing processes as discussed herein.

IC fab 950 uses mask(s) 945 fabricated by mask house 930 to fabricate IC device 960. Thus, IC fab 950 at least indirectly uses IC design layout diagram 922 to fabricate IC device 960. In some embodiments, semiconductor wafer 953 is fabricated by IC fab 950 using mask(s) 945 to form IC device 960. In some embodiments, the IC fabrication includes performing one or more lithographic exposures based at least indirectly on IC design layout diagram 922. Semiconductor wafer 953 includes a silicon substrate or other proper substrate having material layers formed thereon. Semiconductor wafer 953 further includes one or more of various doped regions, dielectric features, multi-level interconnects, and the like (formed at subsequent manufacturing steps).

Details regarding an integrated circuit (IC) manufacturing system (e.g., system 900 of FIG. 9), and an IC manufacturing flow associated therewith are found, e.g., in U.S. Pat. No. 9,256,709, granted Feb. 9, 2016, U.S. Pre-Grant Publication No. 20150278429, published Oct. 1, 2015, U.S. Pre-Grant Publication No. 20140040838, published Feb. 6, 2014, and U.S. Pat. No. 7,260,442, granted Aug. 21, 2007, the entireties of each of which are hereby incorporated by reference.

Aspects of the present disclosure relate to a method of fabricating an integrated circuit. The method includes generating two first-type active zones extending in a first direction, and generating two second-type active zones, extending in the first direction, between the two first-type active zones. The method includes generating a gate-strip extending in a second direction perpendicular to the first direction, and patterning one or more poly cuts intersecting the gate-strip based on a determination of a difference between poly extension effects of a p-type transistor and poly extension effects of an n-type transistor. In the integrated circuit, the gate-strip intersects the two first-type active zone and the two second-type active zone correspondingly at channel regions of two first-type transistors and two second-type transistors.

Another aspect of the present disclosure relate to a non-transitory computer-readable medium having a computer program code stored thereon for generating a layout design of an integrated circuit having poly extension effects. The computer program code is configured to cause a system having at least one processor to execute generating two first-type active zone patterns extending in a first direction, and generating two second-type active zone patterns extending in the first direction between the two first-type active zone patterns. The computer program code is also configured to cause a system having at least one processor to execute generating a gate-strip pattern extending in a second direction perpendicular to the first direction, and determining a difference between the poly extension effect of a p-type transistor and the poly extension effect of an n-type transistor. In the layout design, the gate-strip pattern intersects the two first-type active zone patterns and the two second-type active zone patterns correspondingly specifying channel regions of two first-type transistors and two second-type transistors. The computer program code is further configured to cause a system having at least one processor to execute, if the poly extension effect of a p-type transistor is larger than the poly extension effect of an n-type transistor, generating a poly cut pattern extending in the first direction and intersecting the gate-strip pattern. In the layout design, a combination of the poly cut pattern and the gate-strip pattern specifies a first gate-strip segment and a second gate-strip segment; the first gate-strip segment overlies the channel region of a first one of the first-type transistors and the channel region of a first one of the second-type transistors, and the second gate-strip segment overlies the channel region of a second one of the first-type transistors and the channel region of a second one of the second-type transistors.

Still another aspect of the present disclosure relate to a method of fabricating an integrated circuit having poly extension effects. The method includes determining a difference between the poly extension effect of a p-type transistor and the poly extension effect of an n-type transistor, and creating by a processor a layout design of the integrated circuit, based on the difference.

In the method, creating of the layout design by the processor includes forming at least two first-type active zone patterns extending in a first direction, and forming at least two second-type active zone patterns, extending in the first direction, between the two first-type active zone patterns. In the method, creating of the layout design by the processor also includes generating a gate-strip pattern extending in a second direction perpendicular to the first direction, and positioning the gate-strip pattern over the at least two first-type active zone patterns and the at least two second-type active zone patterns correspondingly and specifying channel regions of at least two first-type transistors and at least two second-type transistors. In the method, creating of the layout design by the processor also includes, if the poly extension effect of a p-type transistor is larger than the poly extension effect of an n-type transistor, generating a poly cut pattern extending in the first direction and intersecting the gate-strip pattern. In the layout design, a combination of the poly cut pattern and the gate-strip pattern specifies a first gate-strip segment and a second gate-strip segment; the first gate-strip segment overlies the channel region of a first one of the first-type transistors and the channel region of a first one of the second-type transistors, and the second gate-strip segment overlies the channel region of a second one of the first-type transistors and the channel region of a second one of the second-type transistors. The method further includes manufacturing the integrated circuit, based on the layout design, including the at least two first-type transistors and the at least two second-type transistors.

It will be readily seen by one of ordinary skill in the art that one or more of the disclosed embodiments fulfill one or more of the advantages set forth above. After reading the foregoing specification, one of ordinary skill will be able to affect various changes, substitutions of equivalents and various other embodiments as broadly disclosed herein. It is therefore intended that the protection granted hereon be limited only by the definition contained in the appended claims and equivalents thereof.

What is claimed is:

1. A method of fabricating an integrated circuit comprising:
    fabricating semiconductor structures in two first-type active zones extending in a first direction;
    fabricating semiconductor structures in two second-type active zones, extending in the first direction, between the two first-type active zones;
    depositing a gate-strip extending in a second direction perpendicular to the first direction, wherein the gate-strip intersects the two first-type active zones and the two second-type active zones correspondingly at channel regions of two first-type transistors and two second-type transistors; and
    patterning one or more poly cuts intersecting the gate-strip based on a determination of a difference between poly extension effects of a p-type transistor and poly extension effects of an n-type transistor.

2. The method of claim 1, where patterning one or more poly cuts comprises:
    patterning a poly cut extending in the first direction and intersecting the gate-strip, wherein the poly extension effect of a p-type transistor is larger than the poly extension effect of an n-type transistor by a predetermined amount; and
    wherein a combination of the poly cut and the gate-strip generates a first gate-strip segment and a second gate-strip segment, and wherein the first gate-strip segment overlies the channel region of a first one of the first-type transistors and the channel region of a first one of the second-type transistors, and the second gate-strip segment overlies the channel region of a second one of the first-type transistors and the channel region of a second one of the second-type transistors.

3. The method of claim 1, where depositing the gate-strip comprises:
    depositing the gate-strip as a continuous gate-strip intersecting all of the first-type zone and the second-type zone, wherein the poly extension effect of a p-type transistor is smaller than the poly extension effect of an n-type transistor by a predetermined amount.

4. The method of claim 1, where patterning one or more poly cuts comprises:
    generating two poly cuts extending in the first direction and intersecting the gate-strip, wherein the poly extension effect of a p-type transistor is equal to the poly extension effect of an n-type transistor; and
    wherein a combination of the two poly cuts and the gate-strip generates a first side gate-strip segment, a center gate-strip segment, and a second side gate-strip segment, and wherein the first side gate-strip segment overlies the channel region of a first one of the first-type transistors, the center gate-strip segment overlies the channel region of a first one of the second-type transistors and the channel region of a second one of the first-type transistors, and the second side gate-strip segment overlies the channel region of a second one of the second-type transistors.

5. The method of claim 4, where the poly extension effect of the p-type transistor is equal to the poly extension effect of the n-type transistor, if an absolute value of the difference between the poly extension effect of the p-type transistor and the poly extension effect of the n-type transistor is less than a predetermined amount.

6. The method of claim 4, where the poly extension effect of the p-type transistor is equal to the poly extension effect of the n-type transistor, if an absolute value of the difference between the poly extension effect of the p-type transistor and the poly extension effect of the n-type transistor is less than or equal to a predetermined amount.

7. The method of claim 1, wherein the first-type transistors are n-type transistors and the second-type transistors are p-type transistors.

8. The method of claim 1, wherein the first-type transistors are p-type transistors and the second-type transistors are n-type transistors.

9. A method of fabricating an integrated circuit comprising:
    fabricating semiconductor structures in two first-type active zones extending in a first direction;
    fabricating semiconductor structures in two second-type active zones, extending in the first direction, between the two first-type active zones; and
    forming a first gate-strip segment intersecting channel regions of a first first-type transistor and a first second-type transistor, and forming a second gate-strip segment intersecting channel regions of a second first-type transistor and a second second-type transistor, wherein lengths of the first gate-strip segment and the second gate-strip segment are determined based on a difference between poly extension effects of a p-type transistor and poly extension effects of an n-type transistor.

10. The method of claim 9, wherein forming the first gate-strip segment and forming the second gate-strip segment comprises:

depositing a gate-strip extending in a second direction perpendicular to the first direction, and patterning a poly cut extending in the first direction and intersecting the gate strip.

11. The method of claim 10, wherein the gate-strip intersects the two first-type active zones and the two second-type active zones correspondingly at channel regions of the first and the second first-type transistors and at channel regions of the first and the second second-type transistors.

12. The method of claim 10, wherein the poly extension effect of a p-type transistor is larger than the poly extension effect of an n-type transistor by a predetermined amount.

13. The method of claim 10, further comprising:

depositing the gate-strip as a continuous gate-strip intersecting all of the first-type active zones and the second-type active zones.

14. The method of claim 9, wherein the first and the second first-type transistors are n-type transistors and wherein the first and the second second-type transistors are p-type transistors.

15. The method of claim 9, wherein the first and the second first-type transistors are p-type transistors and wherein the first and the second second-type transistors are n-type transistors.

16. A method of fabricating an integrated circuit comprising:

fabricating semiconductor structures in two first-type active zones extending in a first direction;

fabricating semiconductor structures in two second-type active zones, extending in the first direction, between the two first-type active zones; and forming a first side gate-strip segment, a center gate-strip segment, and a second side gate-strip segment, and wherein the first side gate-strip segment intersects a channel region of a first first-type transistor, the center gate-strip segment intersects a channel region of a first second-type transistor and a channel region of a second first-type transistor, and the second side gate-strip segment intersects a channel region of a second second-type transistor, and wherein lengths of the first side gate-strip segment, the center gate-strip segment, and the second side gate-strip segment are determined based on a difference between poly extension effects of a p-type transistor and poly extension effects of an n-type transistor.

17. The method of claim 16, wherein forming the first side gate-strip segment, the center gate-strip segment, and the second side gate-strip segment comprises:

depositing a gate-strip extending in a second direction perpendicular to the first direction, and generating two poly cuts extending in the first direction and intersecting the gate strip.

18. The method of claim 17, wherein the gate-strip intersects the two first-type active zones and the two second-type active zones correspondingly at channel regions of the first and the second first-type transistors and at channel regions of the first and the second second-type transistors.

19. The method of claim 17, wherein the poly extension effect of a p-type transistor is equal to the poly extension effect of an n-type transistor.

20. The method of claim 17, further comprising:

depositing the gate-strip as a continuous gate-strip intersecting all of the first-type active zones and the second-type active zones.

* * * * *